US006496802B1

(12) United States Patent
van Zoest et al.

(10) Patent No.: US 6,496,802 B1
(45) Date of Patent: Dec. 17, 2002

(54) SYSTEM AND METHOD FOR PROVIDING ACCESS TO ELECTRONIC WORKS

(75) Inventors: Alexander T. van Zoest; Matthew John DiMeo; Brian Mason Degenhardt; Charles Lawrence Sismondo; Brian Callahan; John William DeRose, all of San Diego, CA (US); George Matthew Costello, La Jolla, CA (US); Tristan Anne Barnum, San Diego, CA (US); James Park, San Diego, CA (US); Joshua Stephens, San Diego, CA (US); Michael Oliphant, San Diego, CA (US); David M Story, San Diego, CA (US); John P. Knott, San Diego, CA (US); James Martin Moore, San Diego, CA (US)

(73) Assignee: MP3.com, Inc., San Diego, CA (US)

( * ) Notice: Subject to any disclaimer, the term of this patent is extended or adjusted under 35 U.S.C. 154(b) by 85 days.

(21) Appl. No.: 09/615,591

(22) Filed: Jul. 13, 2000

Related U.S. Application Data

(60) Provisional application No. 60/175,159, filed on Jan. 7, 2000.

(51) Int. Cl.[7] .............................................. G06F 17/60
(52) U.S. Cl. .......................................... 705/14; 705/51
(58) Field of Search ..................................... 705/14, 51

(56) References Cited

U.S. PATENT DOCUMENTS

| | | | |
|---|---|---|---|
| 3,990,710 A | 11/1976 | Hughes | 369/34 |
| 4,054,911 A | 10/1977 | Fletcher et al. | 348/463 |
| 4,300,040 A | 11/1981 | Gould et al. | 235/381 |
| 4,355,338 A | 10/1982 | Yamamoto et al. | 360/15 |
| 4,449,198 A | 5/1984 | Kroon et al. | 386/83 |
| 4,468,751 A | 8/1984 | Plunkett, Jr. | 360/55 |
| 4,481,412 A | 11/1984 | Fields | 235/462.79 |

(List continued on next page.)

FOREIGN PATENT DOCUMENTS

EP          808048 A2 * 11/1997

OTHER PUBLICATIONS

Webopedia entry for "ripper" at http://webopedia.internet-.com/TERM/r/ripper.html, Feb. 27, 2001.*
Lange, Larry, "MP3 compression opens recording industry's coffers to hackers", Electronic Engineering Times, No. 963 (Jul. 21, 1997): 1.*
"mp3–zone", one page with this heading copied from http://members.teleweb.at/sommeregger.sepp/mpsearch/rip-enc.htm, Feb. 27, 2001.*
DIG–Music: An On Demand Digital Musical Selection Systems Utilizing CATV Facilities, Graham M. Campbell et al., Source Translation & Optimization, To: Bryan Richardson, Cooley Godward from Greg Aharonian (Jun. 11, 1982).

(List continued on next page.)

*Primary Examiner*—Eric W. Stamber
*Assistant Examiner*—Donald L. Champagne
(74) *Attorney, Agent, or Firm*—Howrey Simon Arnold & White, LLP; Derek J. Jardieu

(57) ABSTRACT

The present invention is a system and method for providing access to electronic works over a network. In a preferred embodiment, the present invention offers a user access to electronic copies of works, such as songs, albums, movies, or music videos, over a network. The user responds to the offer by requesting to access to a particular work. Before such a request is granted, the present invention may verify that the user is authorized to access to the work. In one embodiment, the user verifies that they are authorized to access an electronic copy of the work by demonstrating that they possess a physical copy of the work. In another embodiment, the user verifies that they are authorized to access an electronic copy of the work by demonstrating that they ordered or purchased a copy of the work. If a user's authorization is verified, the user may then be provided with access to an electronic copy of the work by such techniques as downloading or streaming.

39 Claims, 19 Drawing Sheets

U.S. PATENT DOCUMENTS

| | | | |
|---|---|---|---|
| 4,506,387 A | 3/1985 | Walter | 359/118 |
| 4,521,806 A | 6/1985 | Abraham | 775/91 |
| 4,703,456 A | 10/1987 | Arakawa | 365/185.08 |
| 4,725,977 A | 2/1988 | Izumi et al. | 711/115 |
| 4,789,863 A | 12/1988 | Bush | 340/5.9 |
| 4,792,849 A | 12/1988 | McCalley et al. | 725/119 |
| 4,811,325 A | 3/1989 | Sharples, Jr. et al. | 369/85 |
| 4,851,931 A | 7/1989 | Parker et al. | 360/15 |
| 4,924,303 A | 5/1990 | Brandon et al. | 725/116 |
| 4,937,807 A | 6/1990 | Weitz et al. | 369/85 |
| 5,021,893 A | 6/1991 | Sheffler | 360/15 |
| 5,041,921 A | 8/1991 | Scheffler | 360/13 |
| 5,051,822 A | 9/1991 | Rhoades | 463/25 |
| 5,084,768 A | 1/1992 | Stern et al. | 386/98 |
| 5,099,422 A | 3/1992 | Foresman et al. | 705/1 |
| 5,168,481 A | 12/1992 | Culbertson et al. | 369/2 |
| 5,208,665 A | 5/1993 | McCalley et al. | 725/119 |
| 5,233,477 A | 8/1993 | Scheffler | 360/15 |
| 5,237,157 A | 8/1993 | Kaplan | 235/375 |
| 5,260,778 A | 11/1993 | Kauffman et al. | 725/33 |
| 5,267,351 A | 11/1993 | Reber et al. | 707/104 |
| 5,319,707 A | 6/1994 | Wasilewski et al. | 380/212 |
| 5,319,774 A | 6/1994 | Ainsworth et al. | 714/20 |
| 5,355,302 A | 10/1994 | Martin et al. | 385/100 |
| 5,365,381 A | 11/1994 | Scheffler | 360/15 |
| 5,400,401 A | 3/1995 | Wasilewski et al. | 380/112 |
| 5,418,654 A | 5/1995 | Scheffler | 360/13 |
| 5,440,637 A | 8/1995 | Van Fleet | 381/1 |
| 5,481,296 A | 1/1996 | Cragun et al. | 725/136 |
| 5,502,601 A | 3/1996 | Scheffler | 360/32 |
| 5,532,920 A | 7/1996 | Hartrick et al. | 707/500 |
| 5,541,638 A | 7/1996 | Story | 348/7 |
| 5,557,541 A | 9/1996 | Schulhof et al. | 700/94 |
| 5,563,665 A | 10/1996 | Chang | 348/552 |
| 5,572,442 A | 11/1996 | Schulhof et al. | 709/219 |
| 5,585,866 A | 12/1996 | Miller et al. | 723/43 |
| 5,592,511 A | 1/1997 | Schoen et al. | 375/220 |
| 5,600,573 A | 2/1997 | Hendricks et al. | 725/109 |
| 5,627,867 A | 5/1997 | Thomson | 377/16 |
| 5,629,733 A | 5/1997 | Youman et al. | 725/53 |
| 5,629,867 A | 5/1997 | Goldman | 381/77 |
| 5,629,980 A | 5/1997 | Stefik et al. | 705/54 |
| 5,633,839 A | 5/1997 | Alexander et al. | 369/30 |
| 5,638,443 A | 6/1997 | Stefik et al. | 705/54 |
| 5,646,992 A | 7/1997 | Subler et al. | 705/53 |
| 5,661,787 A | 8/1997 | Pocock | 379/101.01 |
| 5,675,734 A | 10/1997 | Hair | 705/26 |
| 5,689,648 A | 11/1997 | Diaz et al. | 705/26 |
| 5,703,795 A | 12/1997 | Mankovitz | 345/32 |
| 5,715,403 A | 2/1998 | Stefik | 705/44 |
| 5,721,827 A * | 2/1998 | Logan et al. | 709/217 |
| 5,726,909 A | 3/1998 | Krikorian | 364/514 R |
| 5,734,961 A | 3/1998 | Castille | 725/116 |
| 5,758,257 A | 5/1998 | Hertz et al. | 725/116 |
| 5,794,217 A | 8/1998 | Allen | 705/27 |
| 5,806,068 A | 9/1998 | Shaw et al. | 707/103 |
| 5,809,246 A | 9/1998 | Goldman | 709/219 |
| 5,815,471 A | 9/1998 | Mince et al. | 369/30 |
| 5,845,262 A | 12/1998 | Nozue et al. | 705/26 |
| 5,877,755 A | 3/1999 | Helhake | 345/327 |
| 5,894,119 A | 4/1999 | Tognazzini | 235/375 |
| 5,900,830 A | 5/1999 | Scheffler | 341/123 |
| 5,913,204 A | 6/1999 | Kelly | 705/500 |
| 5,915,090 A | 6/1999 | Joseph et al. | 709/202 |
| 5,918,213 A | 6/1999 | Bernard et al. | 705/26 |
| 5,931,901 A | 8/1999 | Wolfe et al. | 709/206 |
| 5,949,411 A | 9/1999 | Doerr et al. | 345/327 |
| 5,949,476 A | 9/1999 | Pocock et al. | 348/24 |
| 5,956,491 A | 9/1999 | Marks | 709/250 |
| 5,959,944 A | 9/1999 | Dockes et al. | 369/30 |
| 5,959,945 A | 9/1999 | Kleiman | 369/30 |
| 5,960,411 A | 9/1999 | Hartman et al. | 705/26 |
| 5,963,916 A | 10/1999 | Kaplan | 705/26 |
| 5,974,004 A | 10/1999 | Dockes et al. | 369/30 |
| 5,987,525 A | 11/1999 | Roberts et al. | 709/248 |
| 6,005,597 A | 12/1999 | Barrett et al. | 725/46 |
| 6,006,251 A | 12/1999 | Toyouchi et al. | 709/203 |
| 6,011,758 A | 1/2000 | Dockes et al. | 369/30 |
| 6,014,184 A | 1/2000 | Knee et al. | 348/731 |
| 6,044,403 A | 3/2000 | Gerszberg et al. | 709/225 |
| 6,061,680 A | 5/2000 | Scherf et al. | 707/3 |
| 6,088,455 A | 7/2000 | Logan et al. | 380/200 |
| 6,088,710 A | 7/2000 | Dreyer et al. | 707/517 |
| 6,092,105 A | 7/2000 | Goldman | 709/217 |
| 6,092,197 A | 7/2000 | Coueignoux | 713/200 |
| 2001/0033659 A1 | 10/2001 | Eisenberg | 380/203 |

OTHER PUBLICATIONS

Cyberstation goes on the air in show–biz fashion, David Bank, San Jose Mercury News (May 4, 1994): 12D and 20 D.

Printouts of XMCD Website, http:11www.ibiblio.org/tkan/xmcdl, Nov. 13, 2000.

ENVOYPOST: A hybrid Electronic Mail Service, D.J. Rhymas and J.R. Wood, Computer–Board Message Services, Elsevier Science Publishers B. V., 1984, pp. 203–214.

CDNOW Receives Patent for Custom/Digital Technology; Patent Covers the Process for Creating Custom CDs on the World Wide Web, Source: CDNOW, Inc., Yahoo Finance (Nov. 16, 1999).

Sounding Off About Sound, Paul Nicholls, Soft Spot (Jan. 1995): 14.

Log On, Beethoven —*The Beat Goes Online*, Robert Sanchez, Internet World (May 1995): 88–91.

The Merchants of Cyberspace, Anita Amirrezvani, PC World (Apr. 1995): 155–164.

Firms Seek Protecting from Class–Action Suits, Ron Wolf, San Jose Mercury News (Jan. 31, 1994): 10.

Rock Online, Donald St. John, Electronic Entertainment (Jun. 1995): 56–57.

Get Music at Net.Now, Karen Wickre, Computer Life (Mar. 1995).

XMCD Version 1.1. Readme file printout from http:llwww.ibiblio.orgl, Nov. 1, 2000.

XMCD Version 1.2. Readme file printout.
XMCD Version 1.3. Readme file printout.
XMCD Version 2.2. Readme file printout.
XMCD Version 2.3. Readme file printout.
XMCD Version 2.4. Readme file printout.
XMCD Version 2.5. Readme file printout.
XMCD Version 2.6 Readme file printout.
XMCD CD DATABASE. Readme file printout.

CDDB Gracenote Website printout from http://www.oddb.com/.

A Protest Song–90s Style, David Bank, San Jose Mercury News (Jan. 31, 1994): 10/2 pages).

Home music networks; musicians and marketers are going online, Marie D'Amico, Digital Media v4, n2 (Jul. 12, 1994): 18/2 pages).

U.S. provisional application Ser. No. 60/175,996, Eisenberg, Jan. 13, 2000.

Webopedia definition of "streaming", from http://webopedia.com/TERM/s/streaming.html, on Feb. 6, 2002.

Walter, Mark, "Online Journals" print publishers move from pilot to full rollout Seybold Report on Internet Publishing, vol. 1, No. 6, Feb. 1997, pp. 10(11).

XMCD Version 1.4. Readme file printout.
XMCD Version 2.0. Readme file printout.
XMCD Version 2.1. Readme file printout
XMCD version 1.3 source code stored in a CD.
XMCD version 1.4 source code stored in a CD.
XMCD version 2.0 source code stored in a CD.
XMCD version 2.1 source code stored in a CD.
XMCD version 2.2 source code stored in a CD.
XMCD version 2.3 source code stored in a CD.
XMCD version 2.4 source code stored in a CD.
XMCD version 2.5 source code stored in a CD.
XMCD version 2.6 source code stored in a CD.
CDDBD, version 1.3 source code stored in a CD.
Compressed file CDDBD, version 1.4.639 source code stored in a CD.
XMCD version 1.1 source code stored in a CD.
XMCD version 1.2 source code stored in a CD.

* cited by examiner

REMOVE LIST

WELCOME, JOLENE! YOU HAVE THE 3RD LARGEST MUSIC COLLECTION ON MP3.COM (20,235 TRACKS)

MY PLAYLISTS ▶

- RELAXATION
- DRIVING MIX
- WORKING MIX
- WORKOUT MIX
- ROMANTIC
- LULLABIES FOR KAREN
- TOP 40 COUNTRY
- PUNK TOUR '99
- LISTEN TO THIS!
- OXYGEN
- NMA ARTISTS
- GATORADE TOUR
- POKEMON

WORKING MIX ◀ TRACKS 1-250 ▶ 500 TRACKS

| | TRACK NAME | ARTIST | ALBUM | GENRE | TRACK # |
|---|---|---|---|---|---|
| ☒ | ULTRA OBSCENE | BREAKFEAT ERA | BREAKFEAT ERA | DRUM N' BASS | 01 |
| ☐ | XPANDER | SASHA | XPANDER | TRANCE | 02 |
| ☐ | TEQUILA FISH | SQUAREPUSHER | BIG SODA | DRUM N' BASS | 03 |
| ☐ | R.U. AFRAID? | E-SASSIN | R.U. AFRAID? EP | TECHSTOP | 04 |
| ☐ | THE VALAR | BASIC | SLEEPWALKER | ELECTRONICA | 05 |
| ☐ | TOUCHED THE SUN | KRYPTONIC | TOUCH THE SUN | TRIP/HOP | 06 |
| ☐ | PUSH UPSTAIRS | UNDERWORLD | BEAUCOUP FISH | ELECTRONICA | 07 |
| ☐ | SHARE THE FALL | NEW FORMS | RONI SIZE | DRUM N' BASS | 08 |
| ☐ | TIMEBOMB | POP STATE | GORGEOUS | BREAKBEAT | 09 |
| ☐ | EXTRA | KAN ISHI | JELLY TONES | TECHNO | 10 |
| ☐ | ACROPOLIS | JEFF HILLS | X-103 ATLANTIS | TECHNO | 11 |
| ☐ | ENERGY FLASH | JOEY BELTRAM | CLASSICS | TECHNO | 12 |

MOVE TO TRASH    COPY SELECTED TO: [DRIVING MIX ▼]

- PLAY LIST
- CREATE LIST
- RENAME LIST
- REMOVE LIST → PLAYLIST REMOVED

OPTION GRAYED OUT UNLESS EDITABLE PLAYLIST NAME SELECTED.

*FIG. 13*

PLAY SELECTED

WELCOME, JOLENE! YOU HAVE THE 3RD LARGEST MUSIC COLLECTION ON MP3.COM (20,235 TRACKS)

ARTIST ▼ | BLUR | ▼ TRACKS 1-58 ▲ | | 58 TRACKS

TORI AMOS
BECK
BLUR
RED DELICIOUS
SISTERS OF MERCY
UNDERWORLD
FRANK ZAPPA

| ☒ TRACK NAME | ARTIST | ALBUM | GENRE | TRACK # ▼ |
|---|---|---|---|---|
| ☐ TENDER | BLUR | 13 | ROCK/POP | 01 ◊ |
| ☐ SONG 2 | BLUR | BLUR | ROCK/POP | 02 ◊ |
| ☐ BANG | BLUR | LEISURE | ROCK/POP | 03 ◊ |
| ☐ GIRLS & BOYS | BLUR | PARKLIFE | ROCK/POP | 04 ◊ |
| ☐ BATTLE | BLUR | 13 | ROCK/POP | 05 ◊ |
| ☐ BADHEAD | BLUR | PARKLIFE | ROCK/POP | 06 ◊ |
| ☐ TRACY JACKS | BLUR | PARKLIFE | ROCK/POP | 07 ◊ |
| ☐ BEETLEBUM | BLUR | BLUR | ROCK/POP | 08 ◊ |
| ☐ COME TOGETHER | BLUR | LEISURE | ROCK/POP | 09 ◊ |
| ☐ JUBILEE | BLUR | PARKLIFE | ROCK/POP | 10 ◊ |
| ☐ BUGMAN | BLUR | 13 | ROCK/POP | 11 ◊ |
| ☐ LOT 105 | BLUR | PARKLIFE | ROCK/POP | 12 ◊ |

TOP 40 COUNTRY
PUNK TOUR '99
LISTEN TO THIS!
OXYGEN
NMA ARTISTS
GATORADE TOUR
POKEMON

| MOVE TO TRASH | COPY SELECTED TO: | DRIVING MIX ▼ |

PLAY LIST
CREATE LIST
RENAME LIST
REMOVE LIST

OPTION GRAYED OUT UNLESS AT LEAST ONE SONG IS SELECTED. WILL PLAY SONGS IN ORDER OF SELECTION.

REMOVE SELECTED

WELCOME, JOLENE! YOU HAVE THE 3RD LARGEST MUSIC COLLECTION ON MP3.COM (20,235 TRACKS)

MY PLAYLISTS ▼

RELAXATION
DRIVING MIX
WORKING MIX
WORKOUT MIX
ROMANTIC
LULLABIES
FOR KAREN

TOP 40 COUNTRY
PUNK TOUR '99
LISTEN TO THIS!
OXYGEN
NMA ARTISTS
GATORADE TOUR
POKEMON

WORKING MIX    ▼ TRACKS 1-250 ▲    500 TRACKS

| ☒ TRACK NAME | ARTIST | ALBUM | GENRE | TRACK # ▼ |
|---|---|---|---|---|
| ☐ ULTRA OBSCENE | BREAKFEAT ERA | BREAKFEAT ERA | DRUM N' BASS | 01 ◆ |
| ☐ XPANDER | SASHA | XPANDER | TRANCE | 02 ◆ |
| ☐ TEQUILA FISH | SQUAREPUSHER | BIG SODA | DRUM N' BASS | 03 ◆ |
| ☐ R.U.AFRAID? | E-SASSIN | R.U.AFRAID?EP | TECHSTOP | 04 ◆ |
| ☐ THE VALAR | BASIC | SLEEPWALKER | ELECTRONICA | 05 ◆ |
| ☐ TOUCHED THE SUN | KRYPTONIC | TOUCH THE SUN | TRIP/HOP | 06 ◆ |
| ☐ PUSH UPSTAIRS | UNDERWORLD | BEAUCOUP FISH | ELECTRONICA | 07 ◆ |
| ☐ SHARE THE FALL | NEW FORMS | RONI SIZE | DRUM N' BASS | 08 ◆ |
| ☐ TIMEBOMB | POP STATE | GORGEOUS | BREAKBEAT | 09 ◆ |
| ☐ EXTRA | KAN ISHI | JELLY TONES | TECHNO | 10 ◆ |
| ☐ ACROPOLIS | JEFF HILLS | X-103 ATLANTIS | TECHNO | 11 ◆ |
| ☐ ENERGY FLASH | JOEY BELTRAM | CLASSICS | TECHNO | 12 ◆ |

MOVE TO TRASH    COPY SELECTED TO: DRIVING MIX ▼

PLAY LIST
CREATE LIST
RENAME LIST
REMOVE LIST

SELECTED TRACKS REMOVED FROM
THIS PLAYLIST AND PLACED INTO TRASH.

FIG. 18

COPY SELECTED

WELCOME, JOLENE! YOU HAVE THE 3RD LARGEST MUSIC COLLECTION ON MP3.COM (20,235 TRACKS)

ARTIST ▶ | ▼ BLUR | ▼ TRACKS 1-58 ▲ | | 58 TRACKS

TORI AMOS
BECK
BLUR
RED DELICIOUS
SISTERS OF MERCY
UNDERWORLD
FRANK ZAPPA

| | TRACK NAME | ARTIST | ALBUM | GENRE | TRACK # ▶ |
|---|---|---|---|---|---|
| ☒ | TENDER | BLUR | 13 | ROCK/POP | 01 ◆ |
| ☐ | SONG 2 | BLUR | BLUR | ROCK/POP | 02 ◆ |
| ☐ | BANG | BLUR | LEISURE | ROCK/POP | 03 ◆ |
| ☐ | GIRLS & BOYS | BLUR | PARKLIFE | ROCK/POP | 04 ◆ |
| ☐ | BATTLE | BLUR | 13 | ROCK/POP | 05 ◆ |
| ☐ | BADHEAD | BLUR | PARKLIFE | ROCK/POP | 06 ◆ |
| ☐ | TRACY JACKS | BLUR | PARKLIFE | ROCK/POP | 07 ◆ |
| ☐ | BEETLEBUM | BLUR | BLUR | ROCK/POP | 08 ◆ |
| ☐ | COME TOGETHER | BLUR | LEISURE | ROCK/POP | 09 ◆ |
| ☐ | JUBILEE | BLUR | PARKLIFE | ROCK/POP | 10 ◆ |
| ☒ | BUGMAN | BLUR | 13 | ROCK/POP | 11 ◆ |
| ☐ | LOT 105 | BLUR | PARKLIFE | ROCK/POP | 12 ◆ |

[ALL] [PLAY SELECTED] [REMOVE SELECTED]

TOP 40 COUNTRY
PUNK TOUR '99
LISTEN TO THIS!
OXYGEN
NMA ARTISTS
GATORADE TOUR
POKEMON

COPY SELECTED TO: DRIVING MIX ▶ [OK]

[PLAY LIST]
[CREATE LIST]
[RENAME LIST]
[REMOVE LIST]

OPTION GRAYED OUT UNTIL AT LEAST ONE SONG SELECTED.

USER SELECTS A PLAYLIST AND CLICKS "OK".

SELECTED SONGS COPIED TO CHOSEN PLAYLIST.

FIG. 19

CHANGE TRACK NUMBER

WELCOME, JOLENE! YOU HAVE THE 3RD LARGEST MUSIC COLLECTION ON MP3.COM (20,235 TRACKS)

ARTIST ▶

TORI AMOS
BECK
BLUR
RED DELICIOUS
SISTERS OF MERCY
UNDERWORLD
FRANK ZAPPA

TOP 40 COUNTRY
PUNK TOUR '99
LISTEN TO THIS!
OXYGEN
NMA ARTISTS
GATORADE TOUR
POKEMON

PLAY LIST
CREATE LIST
RENAME LIST
REMOVE LIST

BLUR ▼ TRACKS 1-58 ▲ 58 TRACKS

| | TRACK NAME | ARTIST | ALBUM | GENRE | TRACK # ▶ |
|---|---|---|---|---|---|
| ☒ | | | | | |
| ☐ | TENDER | BLUR | 13 | ROCK/POP | 01 ◆ |
| ☐ | SONG 2 | BLUR | BLUR | ROCK/POP | 02 ◆ |
| ☐ | BANG | BLUR | LEISURE | ROCK/POP | 03 ◆ |
| ☐ | GIRLS & BOYS | BLUR | PARKLIFE | ROCK/POP | 04 ◆ |
| ☐ | BATTLE | BLUR | 13 | ROCK/POP | 05 ◆ |
| ☐ | BADHEAD | BLUR | PARKLIFE | ROCK/POP | 06 ◆ |
| ☐ | TRACY JACKS | BLUR | PARKLIFE | ROCK/POP | 07 ◆ |
| ☐ | BEETLEBUM | BLUR | BLUR | ROCK/POP | 08 ◆ |
| ☐ | COME TOGETHER | BLUR | LEISURE | ROCK/POP | 09 ◆ |
| ☐ | JUBILEE | BLUR | PARKLIFE | ROCK/POP | 10 ◆ |
| ☐ | BUGMAN | BLUR | 13 | ROCK/POP | 11 ◆ |
| ☐ | LOT 105 | BLUR | PARKLIFE | ROCK/POP | 12 ◆ |

ALL  PLAY SELECTED   REMOVE SELECTED   COPY SELECTED TO: DRIVING MIX ▶

MOVES SONG UP OR DOWN ACCORDINGLY.

SYSTEM AND METHOD FOR PROVIDING ACCESS TO ELECTRONIC WORKS

RELATED APPLICATIONS

This application claims the benefit of U.S. Provisional Application No. 60/175,159 entitled SYSTEM AND METHOD FOR ENABLING GLOBAL ACCESS AND INSTANTANEOUS LISTENING TO DIGITAL AUDIO, filed on Jan. 7, 2000. This application is hereby incorporated by reference in its entirety. This application is also related to co-pending U.S. Non-Provisional Application Ser. No. 09/559,176 entitled SYSTEM AND METHOD FOR A MULTIPLE-PARTY TRANSACTION, filed on Apr. 27, 2000; and U.S. Non-Provisional Application Ser. No. 09/615,590 entitled A DISTRIBUTION SYSTEM FOR ELECTRONIC WORKS, filed on Jul. 13, 2000. Each of these applications is hereby incorporated by reference in its entirety.

BACKGROUND OF THE INVENTION

1. Field of the Invention

The present invention relates to a system and method for providing access to electronic works over a network.

2. Background

Several technologies exist that enable a user to upload digital music to a Web site storage location and then access that Web site for listening to the music at a later time. For example, mymp3storage.com clients can upload 50 megabytes of music (approximately 12 songs) from the client's hard drive to a storage location on this site, and then download it to a different computer.

Similarly, cablemusic.com uses a Javascript Audio Content Kit ("JACK"), which allows listeners to turn Compact Discs ("CDs") into small, high fidelity, music files. Using these web-friendly music files listeners can turn their personal computers into a personal jukebox and simultaneously upload their favorite music to the cablemusic.com site. Once on the cablemusic.com servers, listeners can construct playlists or listen to their individual songs via direct, immediate access to their music on demand from anywhere on the Web.

Myplay.com permits its members to store, organize, download, and share up to 250 megabytes (approximately 65 songs) of music in an online "locker" on its site. The myplay.com system protects the client's locker with a password. Clients can upload their MPEG-1 audio layer-3 ("MP3") and other digital music files to the site and listen to them from any Web-accessible computer in any order selected by the client.

Myplay.com and i-drive.com also facilitate "sideloading" of MP3 files. For example, the myplay.com system permits users to sideload or directly transfer MP3 files from particular MP3 vendors or from a URL currently storing the MP3 file to the user's individual's locker. This sideload or direct transfer feature obviates the steps of downloading the data, converting the data to MP3 format, and uploading the data to the locker. The client can store music by album, genre, and track. A database provides additional information about artists, including discographies and liner notes.

Unlike the systems described above, the present invention requires the user to actually possess the physical. CD, which encourages individuals to buy CDs and thus furthers the protection of copyrighted material.

Another system in the prior art is described in U.S. Pat. No. 5,987,525 (Roberts et al.), which claims a method for synchronizing delivery over a network of visual content from a first computer to second computer with playing of a musical recording on the second computer. The specification describes a method of searching that uses a unique identifier to identify a user's CD in the user's computer. Upon detecting the presence of a CD in the user's computer, a script in the Web page computes the unique identifier corresponding to the CD and sends this unique identifier to the server. This information can include a uniform resource locator ("URL") that relates to the audio CD (e.g., the artist's home page), simple data such as the names of the songs, and also complementary entertainment (i.e., photographs of the band, artwork, animates, and video clips). In an alternative embodiment, when the user inserts an audio CD into their computer, the browser 1) launches, if not already running; 2) computes the CD's unique identifier, and from this unique identifier derives a URL, and 3) retrieves the URL.

SUMMARY OF THE INVENTION

The present invention is a system and method for providing electronic works to a user. In a preferred embodiment, the system and method offers to provide the electronic works to users over a network. The works may be organized by artist, director, category, type of work, or many other organization models. The works may include songs, albums, movies, music videos, or a variety of other types of work. The electronic works may be obtained by acquiring the content from physical copies of the work, such as a content acquisition system including rippers and encoders.

The user generally accesses the electronic works on a machine capable of connecting to the network, such as a personal computer, hand held computer, cell phone, pager, etc. With their machine, the user may browse through the available works and select a desired work or group of works. The user's selection is sent to the party offering the works.

This party receives the request and processes the request. Such processing may include determining that the user subscribes to the service, such as a login procedure, or verifying that the user is entitled to receive the requested electronic work. The user may verify that they are entitled to receive the desired work several ways, including by demonstrating they own a physical copy of the work or demonstrating they ordered the requested work from a retailer or other distributor.

Once the user adequately shows that they are authorized to receive the requested work, the user is provided with access to the work. In a preferred embodiment, this access is provided with a Content Delivery System. Access may include placing a copy of the electronic work in a user's account, sending a copy of the work to the user, streaming the work to the user, broadcasting the work to the user, or providing the user with a pointer to a copy of the electronic work in the user's account. The user may experience the work from any location with access to the network via a transmission lines or satellite connection.

BRIEF DESCRIPTION OF THE DRAWINGS

FIGS. 8–19 illustrates web pages of a preferred embodiment of an organizational model.

DESCRIPTION OF A PREFERRED EMBODIMENT

Figure 1:
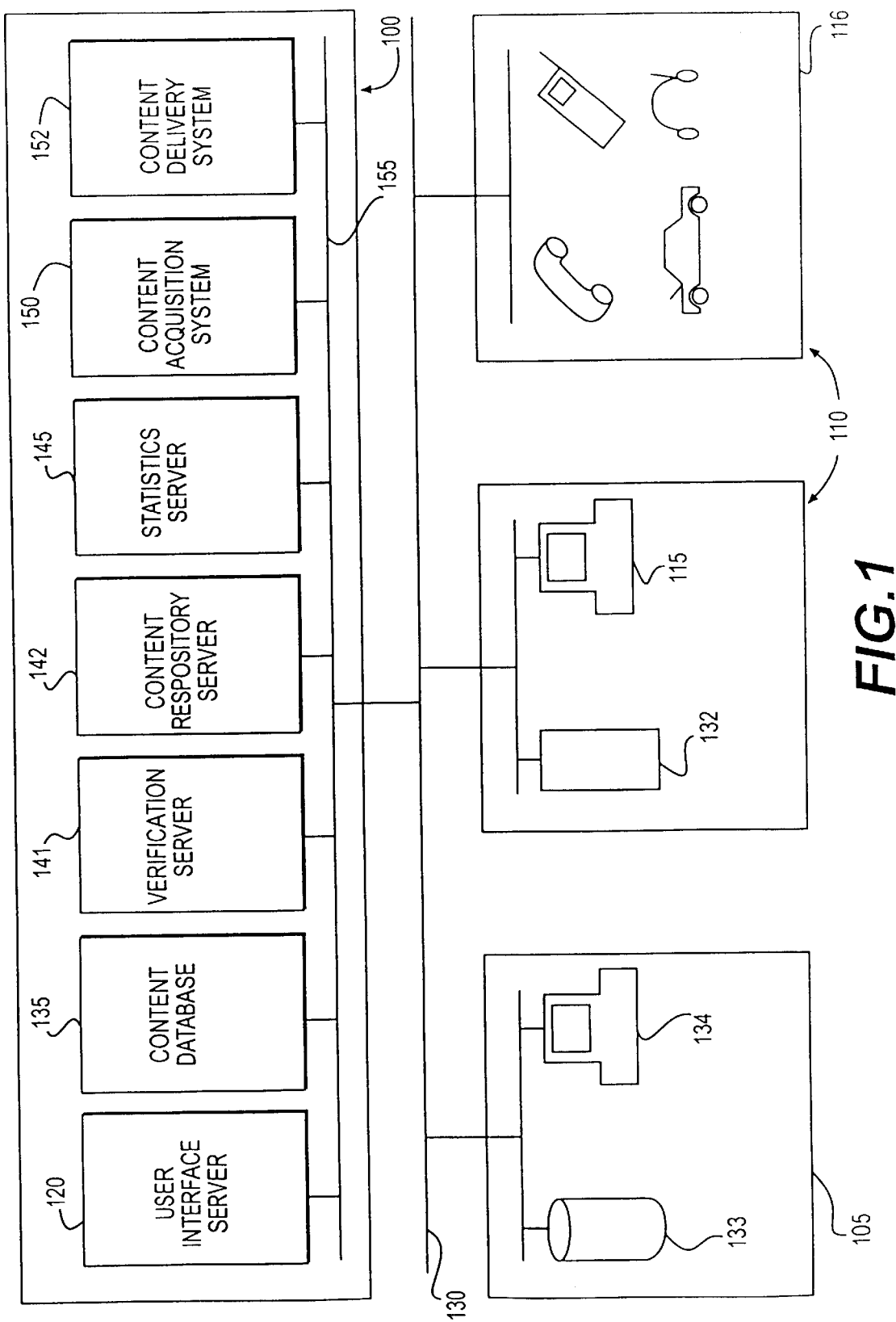
FIG. 1 illustrates an overview of a preferred embodiment of the present invention.

As shown in FIG. 1, the preferred embodiment of the present invention may include a Distributor Location 100, a Partner Location 105, and a Client Location 110. The Distributor Location 100 generally provides access to electronic works. Electronic works include any version of work, such as a downloaded work, streamed, or any other file in electronic memory. The Partner Location 105 may represent any potential business partner with the distributor, such as a business that sells physical works, such as CDs, Digital Versatile Discs ("DVD"), cassette tapes, records, or any other physical works. The Client Location 110 may represent any potential user of the system, such as individuals or artists. The Distributor Location 100, Partner Location 105, and the Client Locations 110 may be configured in a variety of different architectures, such as a client/server or a mainframe. The preferred embodiment uses a client/server architecture. In a client/server architecture, the partner's or client's machine is the requesting machine and the User Interface Server 120 is the supplying machine. The client's machine communicates with the User Interface Server 120 over the network 130.

The network 130 is preferably the Internet. The Internet is a network generally defined as a collection of processing systems and/or networks that are themselves globally networked together. The systems and networks of the global network are connected via any of a number of protocols, such as Transmission Control Protocol/Internet Protocol ("TCP/IP"). The Internet includes the World Wide Web and all of the resources and users on the Internet that are using HyperText Markup Language ("HTML") as the authoring language and HyperText Transport Protocol ("HTTP") and other protocols, such as File Transfer Protocol ("FTP"), as the transport protocol. However, in other embodiments, the present invention may operate on any type of network, including private or dedicated networks.

Internet Protocol ("IP") is the basic communications language or protocol of the Internet. It can also be used as a communications protocol in private networks called intranets. This and other related protocols provide for file transfer, remote log-in, electronic mail, and other services, including distributed processing, as well as other resources. HTML is the set of symbols or codes inserted in a file intended for display on an Internet browser. The markup tells the web browser how to display a web page's words and images for the user. HTTP is the set of rules for exchanging files (text, graphic images, sound, video and other multimedia files) on the Internet. Relative to the TCP/IP suite of protocols, HTTP is an application protocol. HTTP is typically designed to run primarily over TCP/IP and uses the standard Internet setup, where a client machine requests data from a server machine, the server issues the data, and the client machine or "client browser" displays the data. One format for information transfer is to created documents using HTML, which are preferably made up of standard text as well as formatting codes which indicate how the page should be displayed. The web client machine reads these codes in order to display the page. The hypertext conventions and related functions of the Internet are described in the appendices of U.S. Pat. No. 5,715,314, the entirety of which is herein incorporated by reference.

The Client Locations 110 typically include a personal computer 115 capable of, and configured to, interact over network 130. For example, Client Locations 110 may include a multimedia-capable personal computer 115, such as an Apple Macintosh, or IBM compatible, running Linux or Microsoft Windows with a modem for connecting to a network. In alternative embodiments, the client location may be a portable device, such as a laptop computer, cell phone, Palm Pilot®, Walkman®, car stereo, etc.

In a preferred embodiment, the personal computer 115 may also run an Internet browser, such as Microsoft Internet Explorer® or Netscape Navigator®. A browser system is a program that provides a way to look at, read or hear information on the Internet. A browser typically interprets hypertext links, or simple "links," and allows the user to view sites and navigate from one Internet node to another Internet node. A brief overview of web browsers and their interactions is set forth in U.S. Pat. No. 5,774,670, the entirety of which is incorporated by reference. Browsing also refers to the process of moving between HTML pages of a single typical web site. The HTML web page files, or web pages, may include a "homepage." A "homepage" is the main of a web site that typically names and describes the site, and provides links to other web pages or various features of the web site. Clicking refers to the process of indicating a desired link by using a cursor control device, such as a mouse or roller ball.

The Partner Location 105 may include a Server 133, a personal computer 134, or any machine capable of communicating over the network 130. The Server 133 may include a single server or multiple servers depending on the size of the partner, amount of users using the partner, or other system requirements. In a preferred embodiment, the Partner Location 105 uses an application program interface ("API") compatible with the Distributor Location 100. The partner or retailer API may include a retailer module and associated configuration files. In a preferred embodiment, the retailer API communicates with the User Interface Server 120 or the Verification Server 141 via HTTP. Like the other software programs discussed, the retailer API could be written in one of many alternative programming languages, such as C, C++, Java, etc. In a preferred embodiment, it is written in Perl.

The Distributor Location 100 includes User Interface Server 120, Content Database 135, Verification Server 141, Content Repository Server 142, Statistics Server 145, Content Acquisition System, 150, and Content Delivery System 152. The User Interface Server 120, Content Database 135, Verification Server 141, Content Repository Server 142, Statistics Server 145, Content Acquisition System 150, and Content Delivery System 152 may be a single server or a plurality of servers, depending on the size of the Distributor Location 100, amount of users, or other system requirements. This equipment may be connected with a network. In a preferred embodiment, they are connected with a local area network technology, such as Ethernet, Fast Ethernet, Asynchronous Transfer Mode, Fiber Distributed Data Interface, Fiber Channel Interconnect, etc. In a preferred embodiment, this equipment is connected via a local area network using 100 Base-T Ethernet technology.

User Interface Server 120 runs the web site application software and processes some of the transactions and requests associated with the web site, such as logins and content management. The User Interface Server 120 also generates a URL for each request for a work made by a user. The URL generally includes a unique work identifier, a unique user identifier, a time stamp, and session data. In alternative embodiments, the URL may include more or less information.

In a preferred embodiment, the User Interface Server 120 is a dual Intel processor running a Linux operating system and Apache web server with mod_perl. The user interacts with the User Interface Server 120 when they want to access their account or works. This interaction is done over HTTP using an HTML, Extensible Markup Language ("XML"), or a C Library. The User Interface Server 120 may be accessed from anywhere the user has an Internet connection.

Content Database 135 stores information related to the works and processes request from the client machines to extract the stored data. These works may be audio files, video files, audio-video files, or other types of works. In a preferred embodiment, the Content Database 135 is a dual Intel processor running a Linux operating system and MySQL database. The stored information may include the titles of works, names of the artist, information about the band or performance, UPC data, or any information about the works. For example, if the work is a movie, the Content Database 135 may include a preview of the movie or information about its sound track. This information may be manually entered into the database or provided with the content.

Verification Server 141 verifies that the user is authorized to access an electronic work. The Verification Server 141 may perform a variety of tests or comparison to determine whether a user is authorized to access a work, such as, test a confirmation number, verify that the user possesses a physical work, or verify that the user purchased the work. For example, in response to a request to obtain access to an electronic work, the Verification Server 141 may look-up sample data related to that request, such as track offset data or an actual portion of the work. The Verification Server 141 may also compare this sample data to data extracted from a physical work. Based on this comparison, the Verification Server 141 may determine whether the user claiming possession of the physical work does, in fact, have possession and therefore is authorized to access an electronic work. Alternatively, the Verification Server 141 may also determine the user is authorized to access an electronic work by receiving a message from a Partner Location 105, such as a retailer. Accessing an electronic work includes obtaining a pointer to the electronic work in a personal account, receiving a downloaded copy of the work, receiving a downloaded copy of the work with electronic watermarks, receiving a stream of the work, obtaining access to listen to an electronic work, or any other means of allowing a user to listen or watch the work.

In a preferred embodiment, the Verification Server 141 is a dual Intel processor running a Linux operating system, Apache web server, and MySQL database. The Verification Server 141 also runs a Perl program as a common gateway interface ("CGI"). To perform its verification, the Verification Server 141 may read data from the Content Database 135 or Content Repository 142. The Verification Server 141 knows which data to read based on information provided by the Client Location 110 and retained from the original work.

Content Repository 142 stores content and verification data, such as encoded content, sample data, and index data. In a preferred embodiment, the Content Repository 142 is a Sun Solar is E450 server with a Redundant Array of Inexpensive Disk ("RAID") as storage and a Veritas file system. The content and verification data may be accessed by the User Interface Server 120 or the Verification Server 141.

Statistics Server 145 collects data about the electronic works, such as how many partners or clients have access to a work, how many works are available from each artist, how many works are available for each type or category of works, what works are the most popular, what are users' typical click streams, or any other useful data. For example, Statistic Server 145 may receive information from the Client Locations 110, such as what and how often works are uploaded, purchased, or played. Statistics Server 145 could record this information so that the artists may be compensated based on how often their work was used. Statistics Server 145 could also collect a variety of other data, such as billing or advertising.

In an alternative embodiment, Statistics Server 145 may maintain a database with user or partner information, such as how often a user accesses the site, what types of works the user accesses the most, what are users' typical click streams, how often does a partner request that user access, what types of works does a partner usually requests, what are partners' usual click streams, or any other useful information. This information may be used to make the system more user-friendly, target advertising or promotions, or many other uses.

Content Acquisition System 150 acquires content for the present invention. The Content Acquisition System 150 may only include a single computer with a ripper and encoder. However, as the volume of works being added to the system increases, it may be necessary to implement a database-mediated, multi-machine parallel distributed-load architecture to rapidly extract content from different forms of media, such as tapes, CDs, DVDs, etc., as shown in FIG. 2.

Figure 2:
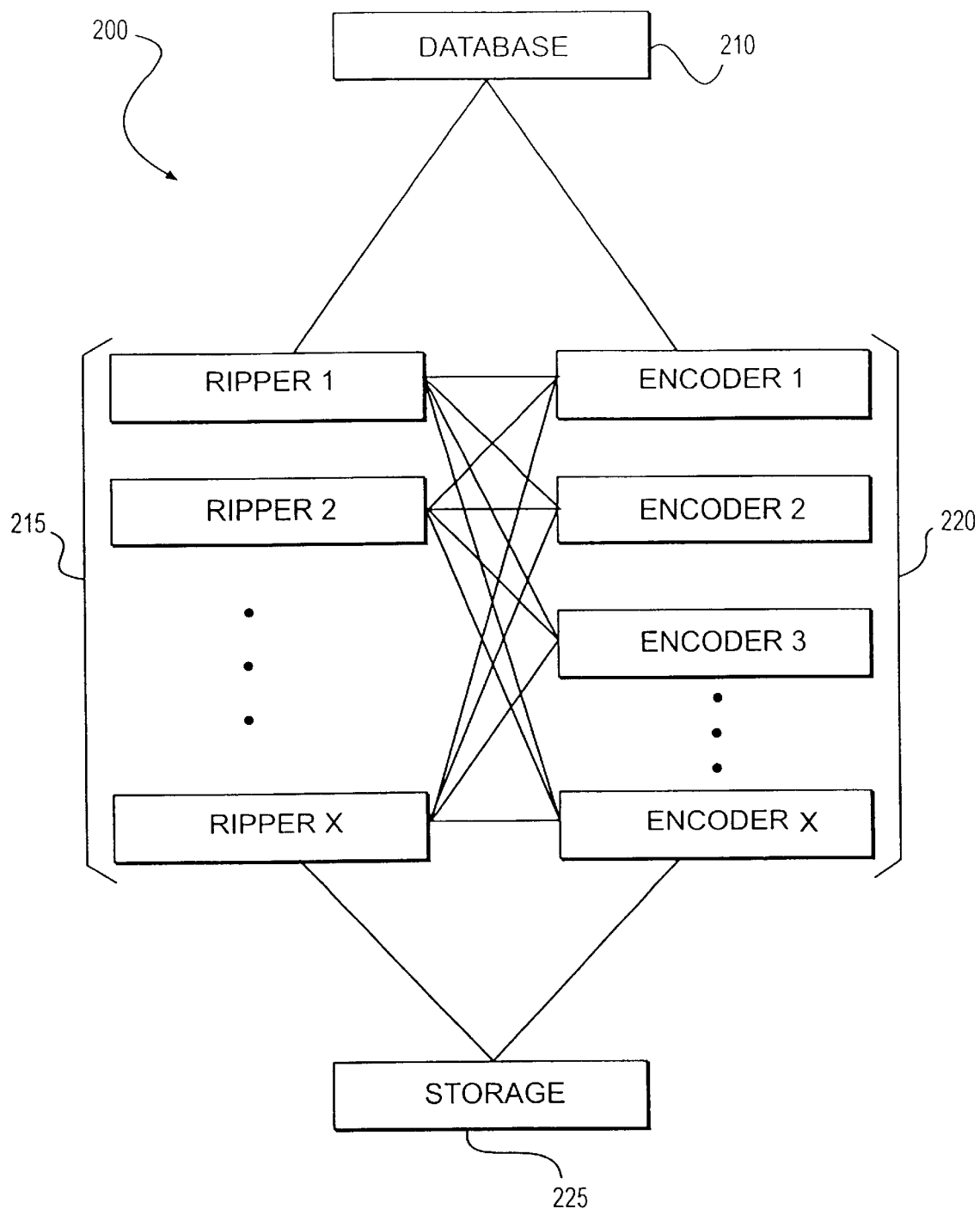
FIG. 2 illustrates a preferred embodiment of the content acquisition system.

FIG. 2 shows a preferred embodiment of the Content Acquisition System 200. In this embodiment, the content acquisition system includes a content acquisition database 210, a plurality of rippers 215, a plurality of encoding machines 220 and one or more storage devices 142 or 225. The content acquisition database or server 210 may be a dual Intel processor running a Linux operating system, Apache web server, and MySQL database. The rippers extract data from a physical copy of the work. There are a variety of types of rippers 215. Rippers 215 may be used extract data from CDs, DVDs, Digital Audio Tapes ("DAT") or any other physical work. In a preferred embodiment, the rippers 215 are single-processor personal computers running Linux software. The personal computers preferably have Plextor® CD-ROM drives, which are optimized for digital audio extraction.

The encoders 220 may perform any of the well known methods of encoding. In a preferred embodiment, the method of encoding includes compression. Also, the encoders may include dual processor personal computers running the Linux operating system. Content acquisition database 220 may be a personal computer running Linux and a MySQL database engine.

In the preferred embodiment, the rippers 215, encoders 220, and content acquisition database 210 are equipped with 100 Mbit Ethernet cards and are coupled to the 100 Base-T Ethernet Standard, but could be implemented according to other standards or on other networks. The storage device is equipped with multiple gigabit Ethernet cards.

The parallel, distributed-load architecture separates the plurality of ripper machines 215 and the plurality of encoder machines 220 because the rippers generally work faster than the encoders. The system balances their relative speed by having more encoders 220 than rippers 215. A preferred embodiment of the present invention uses a 1:3 ratio of rippers 215 to encoders 220, respectively. In this embodiment, the ratio is, in effect, 1:6 because the encoders are dual processor machines, making there six encoding processors for every ripping processor. The ripper to encoder ratio may vary significantly in other embodiments depending on the desired throughput and other system requirements.

The rippers 215 and encoders 220 may be coupled in a variety of configurations. In a preferred embodiment, they are coupled as follows. Each encoder is coupled to each ripper so that each encoder may receive data from all the rippers. In some embodiments, data from a works may also be distributed to multiple encoders 220. The connection between the encoders 220 and the rippers 215 is preferably a high speed data bus. Also, while the rippers 215 and encoders 220 are interconnected, they are not interdependent, so that an individual ripper or encoder may fail and the remaining machines will continue to operate normally.

In a preferred embodiment of the Content Acquisition System 200, the system may also use a queue-based, database-mediated configuration. The queue-based, database-mediated configuration helps compensate for those embodiments where the encoders 220 are slower than the rippers 215. In such embodiments, if all the encoders 220 are busy, the rippers 215 may store the data they ripped into a database and the data may be entered into a queue. The queue may use any of the many well-known scheduling algorithms, such as first-in-first-out or a priority based algorithm.

Once data is entered into the queue or database, it must be determined which encoder should receive the data. This also may be done by any of the well known schedule algorithms, such as longest available. Another example is that the encoders 220 may be numbered, and any data received by the queue or database may sequentially or randomly check to see which encoder is available. If the search is sequential, the data would always go to the first encoder if it was available. If it was not available, it would go to the second encoder. If the second encoder was not available, it would go the third and so forth. In a preferred embodiment, the data is sent to whatever encoder has been inactive the longest. Such a scheduling algorithm is advantageous because it attempts to equalize the burden and wear on each of the encoders.

In another embodiment, the encoders 220 may be programmed to check the queue or database periodically, such as every minute or hour. Also, the encoders may be programmed collectively to check the queue at staggered times so that data is never left in the queue for any extended period of time. Further, when they are programmed collectively, if the encoder scheduled to check the queue at a given time is busy, broken, or off-line, the program may reassign that responsibility to check the queue at that time to a different encoder.

In yet another embodiment, the encoders 220 may receive a message indicating that data was entered into the queue or database for encoding.

When the data is received at an encoder, the encoder may use any encoding method. In a preferred embodiment, the method of encoding includes compression. There are many well-known compression techniques, such as Microsoft Windows Media Format ("WMF"), MP3, MPEG-2 etc. In a preferred embodiment, the system stores digital audio files and compresses them with the MP3 standard.

Content Delivery System 152 pulls content from memory within the system in response to user requests. In a preferred embodiment, the Content Delivery System 152 includes a dual Intel processor running a Linux operating system, Apache web server, and Squid cache software to deliver electronic files. In a preferred embodiment, the Content Delivery System 152 includes a plurality of servers or databases, a coder/decoder, a translation module, and a validation module. The servers or databases provide temporary content storage for frequently requested content. The coder/decoder decodes the request for content. The translation module uses the request for content to uniquely identifying the requested content. The validation module validates that the user is entitled to receive the requested content.

In operation, the system and method of providing electronic works may include content acquisition, access and distribution. As discussed briefly above, content acquisition includes a system and method of acquiring content or electronic works into a database. Content distribution includes a method or system for providing users access to these electronic works.

To acquire content or electronic copies of works (i.e., electronic works), a distributor may obtain the content from physical copies of the work (i.e., physical works), create an electronic work, and store the electronic work in the Database Server 135. In a preferred embodiment, a distributor may obtain an electronic work from a physical work, such as a CD. The distributor may extract the content of the CD with a ripper. Once the content is ripped from the CD, the content may be recorded into a database. Accordingly, the distributor can provide users with access to the electronic work over the network 130.

In a preferred embodiment, the distributor collects multiple electronic works to provide a more complete database. For example, the distributor may want to provide electronic works by a particular group or movies with a particular actor. Accordingly, in some embodiments, the distributor may take some steps to organize the content database, such as labeling the electronic copies or encoding metadata, such as a unique identifier, title, director, artist name, actor names, or any information potentially helpful to identify, categorize, locate, or track the work. In a preferred embodiment, each physical work is labeled with a unique bar code, such as a unique purchase code ("UPC") code. The distributor may track the bar codes throughout the system for security, control, integrity, and accounting purposes. The labeling, as well as other functions in the content acquisition, may be done with an automated system or with human operators.

The distributor may also encode the extracted data so that it may be transmitted with less bandwidth and stored with less space. In a preferred embodiment, as shown in FIG. 2, the distributor extracts the data with rippers 215 and encodes the data with encoders 220. The rippers can receive CDs or any other type of physical work. An operator or an automated system can scan the physical works label before the physical work is placed in a ripper. The scanned label may be stored in the Content Database 135 so that the Content Database 135 records which works were acquired.

The rippers 215 extract the raw data from the CD one track at a time until it has extracted all its data. Next, the rippers 215 temporarily store the data from each track in a separate uncompressed digital data ("WAV") file on a local hard disk. In alternative embodiments, the data may also be stored in a separate database.

The ripper also randomly extracts portions or "samples" of the raw data from each track on the CD. These samples are used in the verification process (i.e., a process that determines whether the user is authorized to access an electronic work) described below. In this embodiment, the samples may be any predetermined amount of the data. In the case of CDs, the CDs are divided into sectors, wherein one second of music includes 75 sectors. The rippers 215 may extract samples of any size. The samples may be identified randomly, sequentially, or by any programmed algorithm. The ripper may extract one or multiple samples. The one or more samples may be from one work or several works (e.g., songs or tracks) within a larger work (e.g., a CD or DVD).

The ripper may also store each sample as a separate file, store each sample separately with a separate index file, store the samples collectively as a file, or in many other combinations. Index data corresponding to the samples may be stored in many ways, such as in the same file as the raw data or in separate index file. In a preferred embodiment, the system stores this sample data in a separate file for each track and also stores a separate index file that specifies which samples the ripper extracted and where these samples can be found in the samples file. The data in the index files is then used to verify whether the user is authorized to upload, or later receive access to, the electronic copy of the work. In a preferred embodiment, the ripper extracts ten percent of the WAV data for samples. In alternative embodiments, the ripper may extract any amount of WAV data between 0–100% for samples. For security purposes, the sampling algorithm including the size and location of the samples can be confidential or random.

Once the content data, sample data, and index data are extracted, a preferred embodiment encodes the content data with the encoders. The encoders may receive the content data from the rippers 215 local memory, the content acquisition database 210, or from any database or storage medium used to hold the raw content data until an encoder is available to encode it. The sample and index data may be stored in the rippers 215 or an associated database, such as the content acquisition database 210 or storage 142 or 225. In an alternative embodiment, the encoders 220 may also receive the sample and index data.

In a preferred embodiment, the content data is stored in the ripper. In another embodiment, the content data may be stored in the content acquisition database 210, and the content acquisition database 210 controls an encoding queue that controls the transfer of content data to the encoders 220. The content acquisition database 210 loads pointers in the encoding queue or database table. The pointers identify the raw content data for the various works and point to where this raw content data is stored.

When a pointer is entered into the encoding queue, the encoding queue may actively seek an available encoder or passively wait until an encoder checks the queue or detects the new entry. In a preferred embodiment, the encoders 220 repeatedly check for entries in the queue. An encoder may also automatically check the queue whenever it completes encoding a data entry, completes a task, or is activated again after being off-line. When there is data that needs to be encoded, the content acquisition database 210 identifies the next entry in the queue. An encoder may retrieve the raw content data from the ripper that extracted the data or a variety of other storage locations.

Upon receipt of the data, the encoders 220 encode the WAV data into a compressed file, such as MP3 or other formats. In a preferred embodiment, the encoders 220 encode one or more files for each song; for example, the encoders may encode one instance at 128 kilobits per second (i.e., near CD quality) and a second instance at 24 kilobits per second (i.e., AM radio quality). Depending upon the desired sound quality, encoding can be done at a variety of bit rates.

In another embodiment, the content acquisition process can skip the encoding process where the data is already in a suitable compressed format. For example, a DVD is already in compressed MPEG 2 format, so no further compression may be needed. Similar applications can include WMF, MPEG-4, or the like. In these situations, the content acquisition can simply rip the data from the DVD and skip the encoding phase altogether.

Once an encoder completes encoding all the tracks from a CD, the encoder notifies content acquisition database 210 the encoding is complete. The content acquisition database 210 then inserts an entry, a pointer (i.e., completion pointer), or set of pointers into the encode queue. A completion pointer indicates that all these tracks are encoded and ready for storage. When the content acquisition database 210 detects that all the smaller works (i.e., tracks) within a larger work (i.e., a compilation of several works) are encoded, the queue tells content acquisition database 210 to move the larger work into a finalizing queue.

The encoders 220 monitor the finalizing queue and transfer the encoded data in the queue out to a storage machine, such as the content acquisition database 210. Each encoder may write to the storage machine in parallel. The encoded data may be transferred to the storage machine by a number of well-known techniques. In one embodiment, the file with the encoded data may include the sample data and the index data. In another embodiment, the sample data and index data may be sent to the storage machine from other machines, such as the ripper that extracted the data, in parallel to the encoded content data from the encoder(s).

In a preferred embodiment, the encoded data may be transferred to storage as follows. The ripper that encoded the work may be connected to the storage machine. Through this connection, that ripper forwards the sample and index data for the completely encoded work. The encoder that encoded the content data also connects to the storage machine and forwards the encoded data to the storage machine. In alternative embodiments, multiple encoders may have encoded different tracks in the same work so that each of these encoders would need to forward their encoded data to the storage device. The transfer of data from the encoder or encoders and the ripper may occur in parallel or series. In yet another embodiment, the encoded data may include the sample and/or index data. Thus, a transfer of data from the ripper may not be necessary.

In a preferred embodiment, the encoders 220 transfer encoded versions of each track to the storage machine 142. Thus, the storage machine 142 contains an encoded electronic work as well as its corresponding sample data and index data.

Once the content acquisition database 210 stores the electronic work, the content acquisition database 210 acquires and associates the artist, title, and track name information for the stored work through direct data entry or third party databases. In an alternative embodiment, people can manually enter this information into the content acquisition database 210. In yet another embodiment, this data may be automatically obtained from the metadata or other types of information stored in the physical work, such as electronic or digital watermarks. The content acquisition database 210 uses a web-based tool to interactively verify that the metadata is correct. If approved, the content acquisition database 210 may update and name the files on the storage machine to reflect the artist, title, track name information, director, actors, or any other potentially useful information.

In a preferred embodiment, the data acquired by content acquisition techniques is stored in a central database, such as the content acquisition database 210. In a preferred embodiment, the content acquisition database 210 may be the same as the Content Repository 142. In an alternative embodiment, data could be stored in a decentralized architecture, including smaller databases at different locations. In either a centralized or decentralized architecture, the frequently accessed data could also be temporarily stored at remote locations, such as temporary memory locations at the Client Location 110 or at nodes throughout the network 130, such as signal transfer points, central offices, cable nodes, etc.

Figure 3:
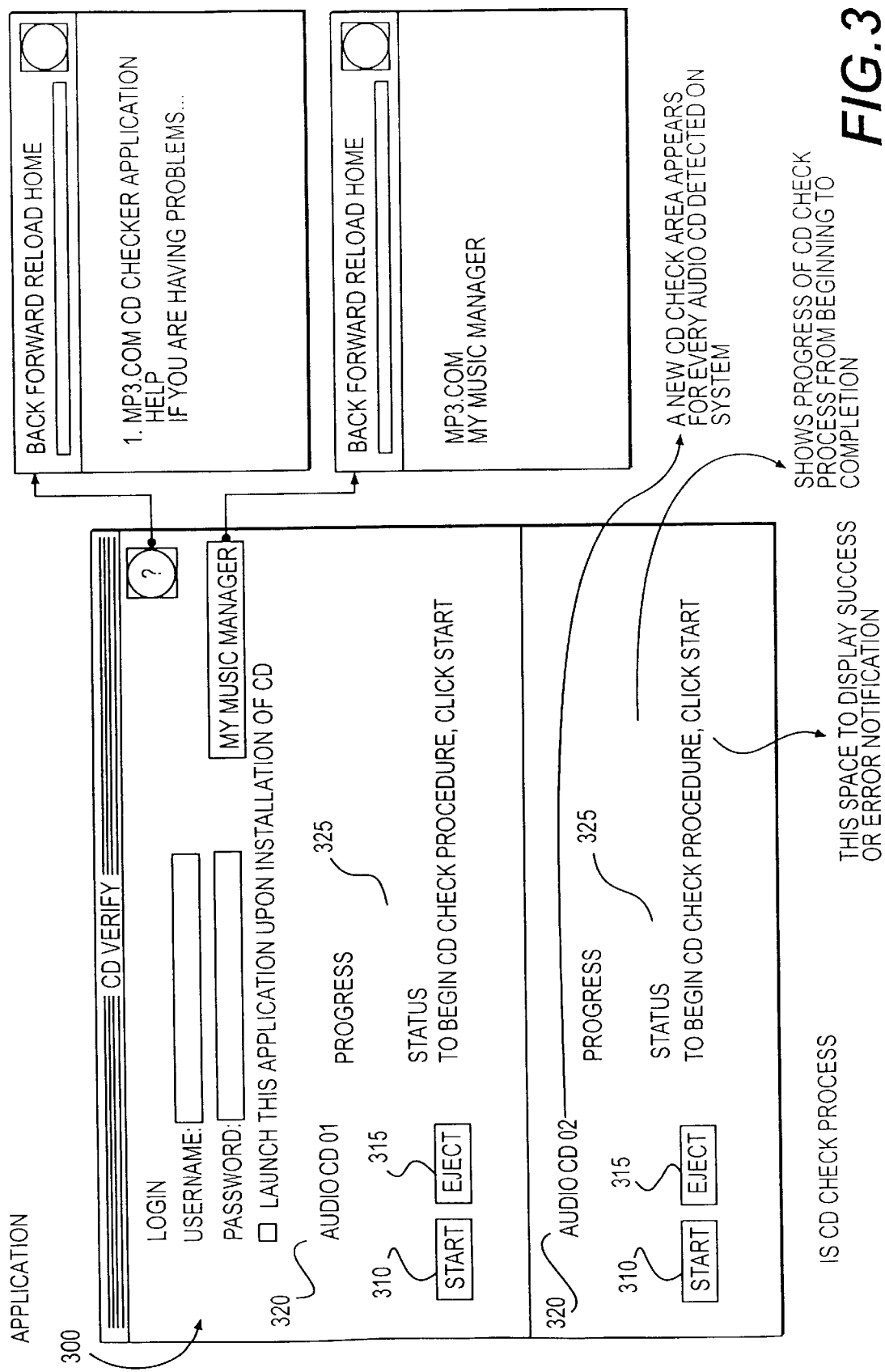
FIG. 3 illustrates a preferred embodiment of a web page.

Once the content is acquired or made accessible from a third party, a user can access this content with a personal computer 115, cell phone 116, or any device with Internet access. More specifically, the user accesses the data through the User Interface Server 120. The User Interface Server 120 displays a web page to users that access the system over the network 130. To access the system, the web site preferably requires the user to login before the user is permitted to access the site. FIG. 3 shows an example of a typical login 300, which requires the user to enter a previously assigned user identification and password. Typically, the user identification is freely displayed when entered, but the password is masked to prevent unauthorized user from obtaining an authorized user's password. The login procedure may also permit the user to change their password. Further, if an unauthorized user wants to become an authorized user, the login procedure could provide the unauthorized user with an additional screen(s) requesting information needed to become an authorized user, such as name, address, company, telephone number, credit card number, etc.

Once the user accesses the system, the system offers to provide or distribute a plurality of works to the user over the network 130. The works may include audio, video, audio/video, and many more. The works are preferably musical works, music videos, movies, advertisements and promotions. The list of works is viewable and/or searchable by categories, such as artist, type of work, type of music, type of movie, alphabetical order, etc. The list of works may include a list of promotions, advertisements, infomercials or other promotional works. From this list, the user may select the works it wants to receive. In an alternative embodiment, the user may be able to create their own collection of works, such as their own greatest hits or favorite movies.

The web site may also offer a variety of other functions, such as the opportunity to purchase or listen to various works or parts of works. For example, the most frequently requested works or new releases may be listed on one page. In other embodiments, each page may be dedicated to a certain category of works, such as jazz music, action movies, or high energy music. In yet another embodiment, the pages may be organized by alphabetical order accordingly to the name of the artist or the title of the work.

After the user accesses the web site and identify themselves through the login procedure, the user may also access their own personal account. The account may store copies of works that the user has bought through the web site or demonstrate authorization to receive access through other means. In a preferred embodiment, the user may receive access to some works without any verification because they are publicly available. To receive other works, the user may demonstrate that they are authorized to access the work. A user may demonstrate authorization or ownership of a physical work many ways. For example, a user may receive a confirmation number with the purchase of the work, and the web site may ask the user to enter that confirmation number. To prevent others from demonstrating authorization with the same physical work, each confirmation number will only be accepted by the distributor once. The web site could control the use of such numbers by comparing each entry to a list of previously entered confirmation numbers in a database.

In another preferred embodiment, the user would load their physical work into their client machine. For example, the user would load their CD into the CD tray of a personal computer. The User Interface Server 120 could then request information about that work the personal computer, such as the title of the work, title of the artist, and a unique label code on the work. With this information, the Verification Server 141 attempts to identify the corresponding work in the Content Repository 142. By identifying the corresponding work, the Verification Server 141 can verify that the user has an authorized physical copy of the work.

To communicate with a server or system within the Distributor Location 100, client machines may issue commands to the Distributor Location 100. These commands may include tokens, which are typically the name of the command. Additional tokens on the command line include attribute-value pairs. In one embodiment, attributes are lower-case names consisting of 1 to 15 characters from the set of 'a' to 'z,' '0' to '9,' and '_.' The attribute values may be decimal numbers, text strings, or a size or byte length. For example, a typical command is HELO mail=matthew@mp3.com, where 'HELO' is the command name, 'mail' is the attribute name, 'matthew@mp3.com' is the value associated with this attribute name. There may be zero or more attribute-value pairs as part of the command. In particular embodiments, one attribute can have multiple values.

In response to these commands, a server may transmit responses back to the client machines. Each response includes a number representing a status. Zero or more attribute-value pairs may also be included with the command.

To establish a connection between a client machine and the Distributor Location 100, the client machine sends a command to the server in order to identify itself. This command preferably includes at least one attribute that identifies the client or user. This attribute can be the user's email address (e.g., mail=matthew@mp3.com) or a user identification that the Distributor Location 100 previously assigned to the user, such as a confirmation number or unique identification number. On a secure connection, the user may send a clear-text password. Similar attributes may also be used in setting up this connection. The Distributor Location 100 responds by confirming proper identification, requesting further information, or sending an error message.

For example, a preferred command is the verify CD command, "VFCD time=3299 tkof=150, 20527, 41050, 49605, 74047, 106747, 127405, 144647, 170740, 186637, 202832, 223672." The 'time' attribute is represented in seconds. For example, there are 3,299 seconds of data on this particular CD. The 'tkof' attribute is a multi-valued list of track offsets in sectors. The first number, 150, is the sector offset to the first track on the disk. The second number is the sector offset to the second track on the disk, and so on. The second-to-last number is the sector offset to the start of the last track. The last number is the sector offset to the first sector past the last track; in other words, the length of the disk in sectors. Thus, on this CD there are eleven tracks or songs. Alternative validation attributes can include the title of work, the name of the artist/performer/band, the name of the leading actors, etc.

Another preferred Verification Server 141 command initiates a request for data from the physical work, such as "RVDT trck=1 sect=12071 nsec=4 size=9408." In response, the client machine sends the requested bytes of data, which in this example, corresponds to the four sectors of data found on track 1 and starting at sector 12071.

In some embodiment, Verification Server 141 may compare the data from the physical work loaded by the user to a single electronic work stored in a database. In other embodiments, a server may compare the data from the physical work to multiple electronic works because the work was copied multiple times. In the CD example, this may occur because a certain work was pressed into a CD multiple times or with multiple machines. For example, a music group may have first pressed a CD of a work in May 1995, but then pressed a new CD for the same work in May 2000. Accordingly, although the works appear the same from listening or watching the work, the two electronic copies may be different. Further, a group may have a work pressed with two different machines for the same release. Accordingly, in these instances, a preferred embodiment would have an electronic copy of the CD from each pressing. Specifically, the distributor would have an electronic copy from a CD pressed with each of the two machines in May of 1995 and an electronic copy of the CD pressed in May 2000.

With all three electronic copies, the Verification Server 141 would be able to verify authorization to access the work with any of the CD including that work. Whereas, if the distributor only had an electronic copy of the work as pressed in May of 1995, a user may be unable to demonstrate authorization to access the work with a CD pressed in May of 2000.

Once the CD is loaded into the computer's CD tray, the comparison of the stored electronic data to the data from the physical work may start automatically or upon the user's direction. In a preferred embodiment, as shown in FIG. 3, the user could initiate the comparison by selecting an icon displayed on the web page, such as the start icon 310. The user may also be able to cancel or eject the work from their machine by selecting an icon on the web page, such as the eject icon 315. Also, a web page or any type of display may show the name or some type of identifier of the work 320, as well as the status of the comparison 325. The status field could show statuses, such as "comparison in progress," "comparison of sample 4 in progress," "comparison on hold," "comparison third in queue," etc.

The display may also provide customer service options, such as an online help menu, an icon to obtain a live customer service representative, or an email field that provides a email field including the email address for the user to send an email to customer service representative. The live customer service representative could be down with a separate telephone line connection, such as a return call or a Voice Over IP connection. These customer service options may also provide information about the works.

In a preferred embodiment, if the machine at the client location is a personal computer, the personal computer 115 may have customized software to conduct the verification. The software on the user's machine may collect and send a stream of data corresponding to the track offsets associated with each track. Similarly, software at the Distributor Location 100 may also receive the track offset information or other information about the work for use in the verification process.

In alternative embodiments, multiple software programs may be use to collect information from the physical work and send that information to the Distributor Location 100. Such information may include title, artist, actor names, UPC code, digital watermarks, or any other useful information.

There are many types of comparisons that could be made to verify a user's authorization to receive access to a given work based on data from a physical work. One such comparison is a comparison of the track offset data on the stored electronic copies of the work and the corresponding track offset data on the physical work loaded into the user's machine. In a simplified example, if the track offset data of the physical work is 150, 19860, 39740, 59130 for each of the first four works, the distributor's server or servers can search its database for all stored electronic works with similar track offset data, such as track offsets within a range of values. These ranges may include the following track offset ranges for the physical work: 80–220; 19790–19930; 39670–39810; and 59060–59200. Thus, a search using these ranges would produce the following three electronic works:

Electronic Work A: {150, 19860, 39740, 59130}
Electronic Work B: {110, 19810, 39690, 59080}
Electronic Work C: {170, 19900, 39790, 59170}

In another embodiment, a search for the exact match may be performed before the system performs the flexible range search. Although, exact matches require more accurate recordings, an exact match search may reduce the search time and more quickly identify the related electronic work. For example, using the above facts, such a search would only identify Electronic Work A.

In yet another embodiment, the distributor's servers may only search a subset of their stored electronic works, such as the works with a certain identification code, the works with the same or similar titles, the works from a given artist, etc.

Further, the comparison may search for one track offset or multiple track offsets within a work. For example, the software may compare the track offset for each work on a CD, may compare several track offsets within the same work, or may compare any combination thereof. The location of the track offsets used for these comparison may be predetermined, one of a finite number of possible comparison scenarios, or randomly selected for each work.

In another embodiment, the comparison may include multiple layers of searching. For example, the comparison may first check the database to determine whether there are any stored works with the exact track offsets. If no such work exist, the comparison could proceed to check whether there were any works with almost exact track offsets by searching for a small range, such as a track offset from 120–180. If such a work is still not found, the comparison may search for works within a larger range, such as 80–220, and so on.

In another embodiment, the comparison may also include layers to distinguish between two works identified during the same search. For example, if a search identified two works, the comparison may compare a different set of track offset or set of track offsets. If the first search only looked for works with a track offset of 120–180 for the first work on a CD and the search identified three stored works. The comparison may proceed to compare the track offsets of the second work on the CD or from just another portion of the CD.

If there are no stored electronic works within specified range, the User Interface Server 120 may inform the user that their physical work was not accepted or not eligible for inclusion into their personal account. The User Interface Server 120 can also provide the user with the plurality of customer service options identified above. In alternative embodiments, the system tests to identify whether the physical work, confirmation number, UPC code, or other authentication information enter was already entered by a previous user or for some other reason appeared fraudulent. The system could automatically preclude the user from any further access to the user's personal account and prevent them from logging back in.

If the comparison identifies a stored electronic work that is within a specified range, the User Interface Server 120 may allow the user to upload the data on their physical copy to the Content Repository 142, or may provide a pointer to the stored electronic work within the user's personal account. If the comparison identifies one or more electronic works that are close, but not close enough to authenticate the user's ownership of the work, the system may continue to verify the user's ownership of a physical work with additional tests.

Another technique to verify a user is otherwise authorized to receive access to an electronic copy of the work is to compare portions of the physical work to portions of the stored electronic work. This type of comparison could be the only comparison used for verification, or can be used after the number of works for comparison has already been reduced by other means. For example, before comparing portions of the physical work to the electronic work, some embodiments may narrow the number of stored electronic works for comparison based on other information about the work, such as the artist, title, year, etc.

In a preferred embodiment, this comparison is run after the track offset comparison to narrow the number of eligible works. For example, the Verification Server 141 can request that the user's machine to send a portion of data, such as the 5 sectors of data found on track two beginning at the thirtieth second of playing time. The portion of data requested may be predetermined or determined randomly. The user's machine responds by sending the requested sample of data. The Verification Server 141 then compares this requested data with the samples of data previously extracted and stored during the content acquisition.

Figure 4:
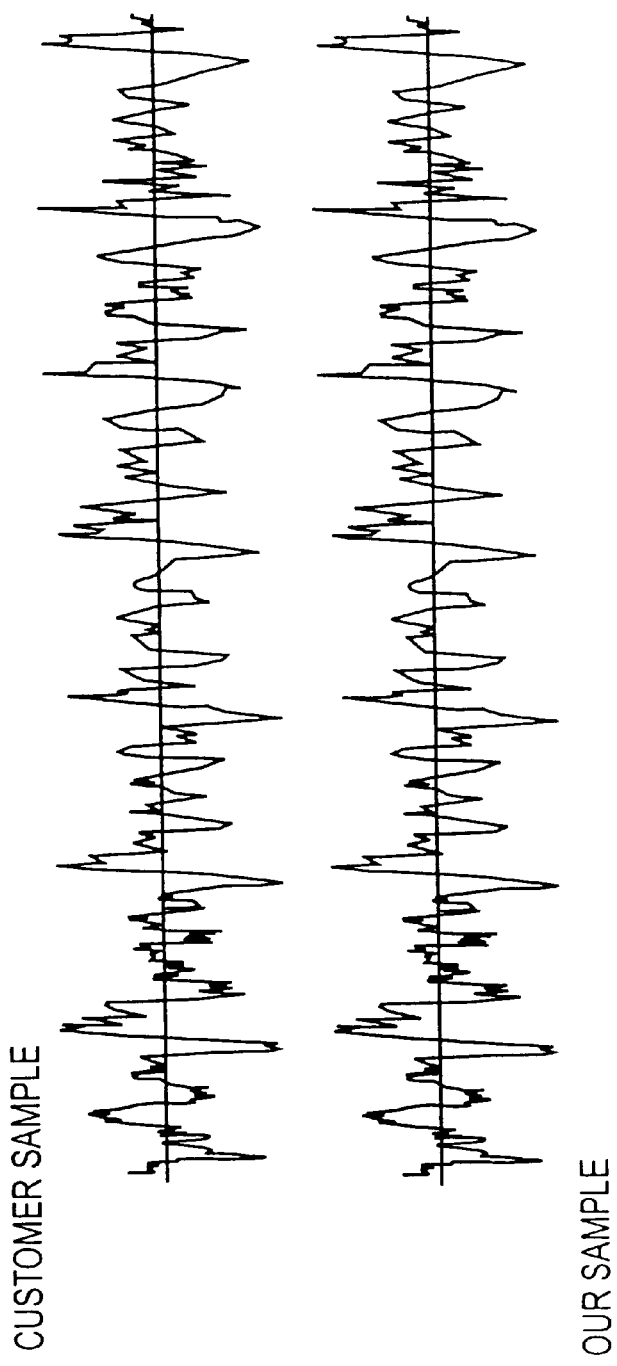
FIGS. 4–7 show data samples used to illustrate the validation process.

Such a comparison may simply compare each sample or the comparison may add some additional steps to make sure that the comparison is comparing like data. For example, the straight comparison of samples may be used with equipment that accurately reads the recorded works or the samples are identified in a way that minimizes problems caused by mechanical error, as shown by FIG. 4.

In a preferred embodiment, such a comparison may make sure it is comparing like data with many well-known techniques, such as correlation and/or phase shifting. Specifically, the Verification Server 141 requests a portion of data from a client machine. The client machine collects this data from a physical work and sends this data to the Distributor Location 100. The Verification Server 141 receives the corresponding data collected from the physical work and determines whether this data can match up with the data of one or more stored electronic works. To reduce possible problems caused by mechanical error, the comparison may not match the data exactly as it is received. Instead, the Verification Server 141 may first identify whether any portion of the sample received from the first work potentially matches any portion of a stored electronic work or sample of a stored electronic work. Once it identifies the corresponding portions of data for maximum correlation, the Verification Server 141 may use correlation and/or phase shifting techniques to manipulate the data so that the comparison is not thrown off by mechanical inaccuracies, such as the inaccuracy of the user's personal computer reading a CD.

Figure 5:
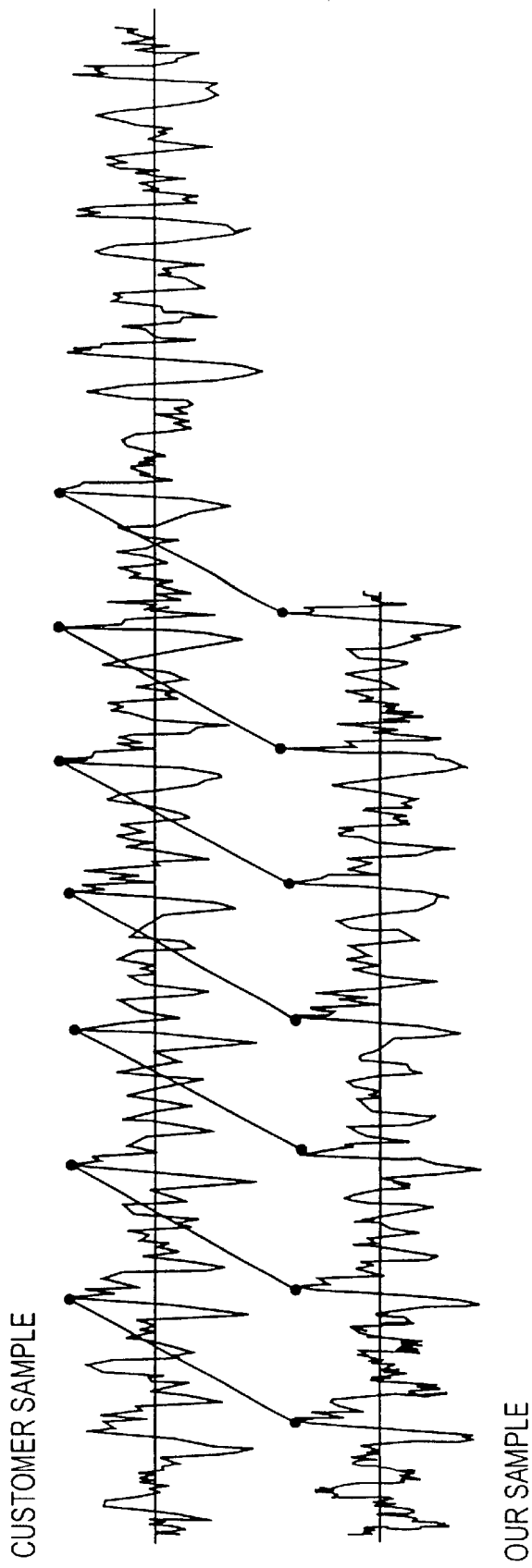
Figure 6:
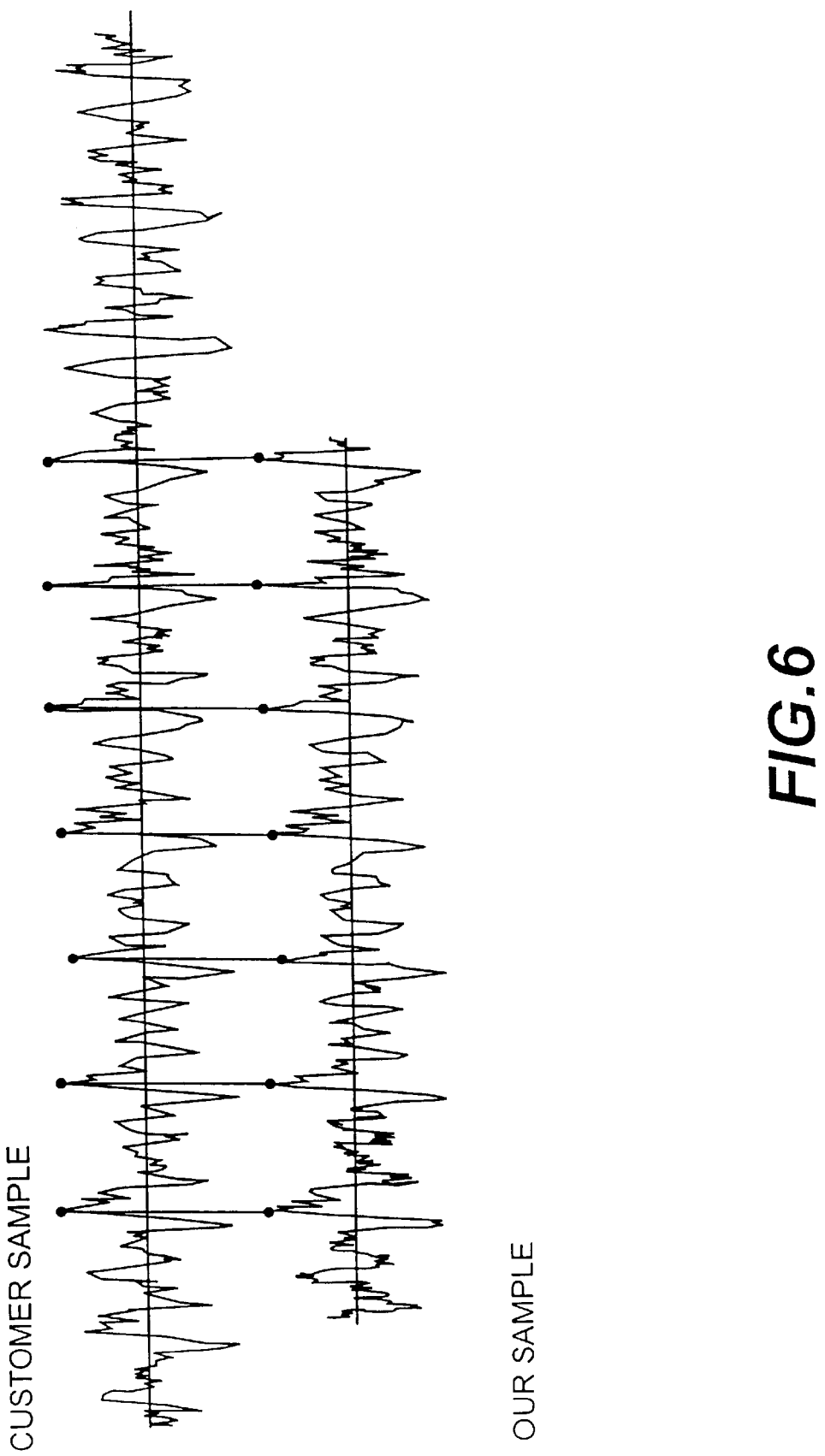
Figure 7:
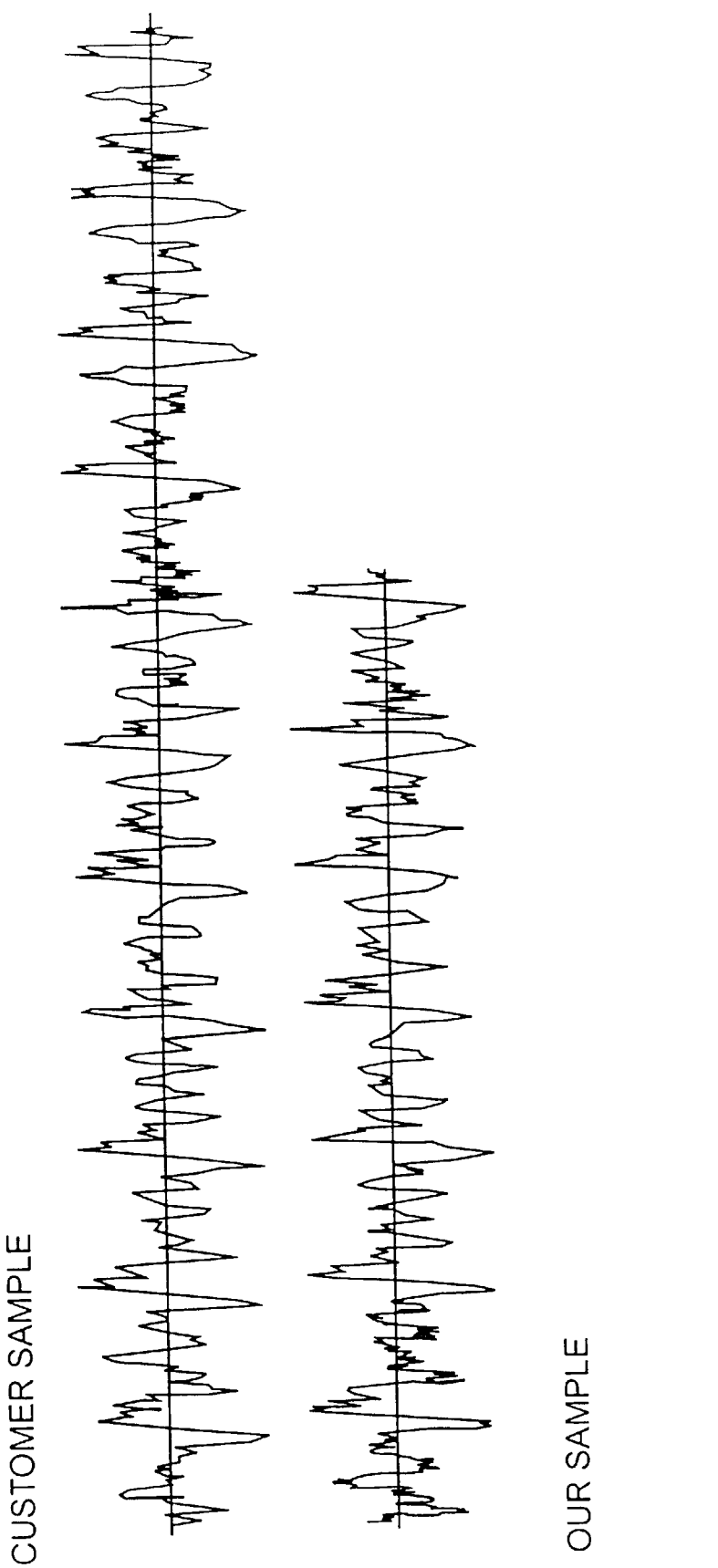
Figure 8:
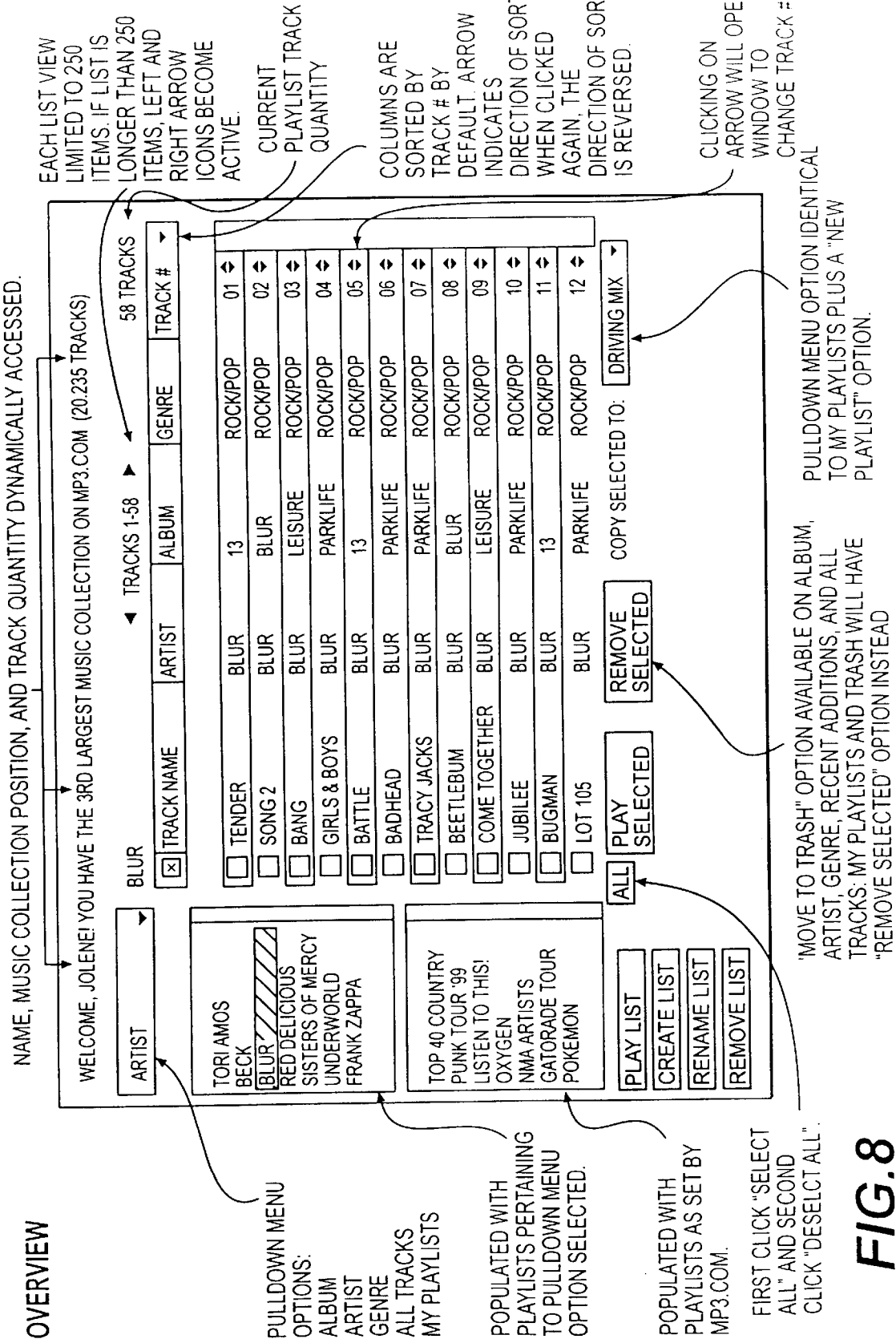
Figure 9:
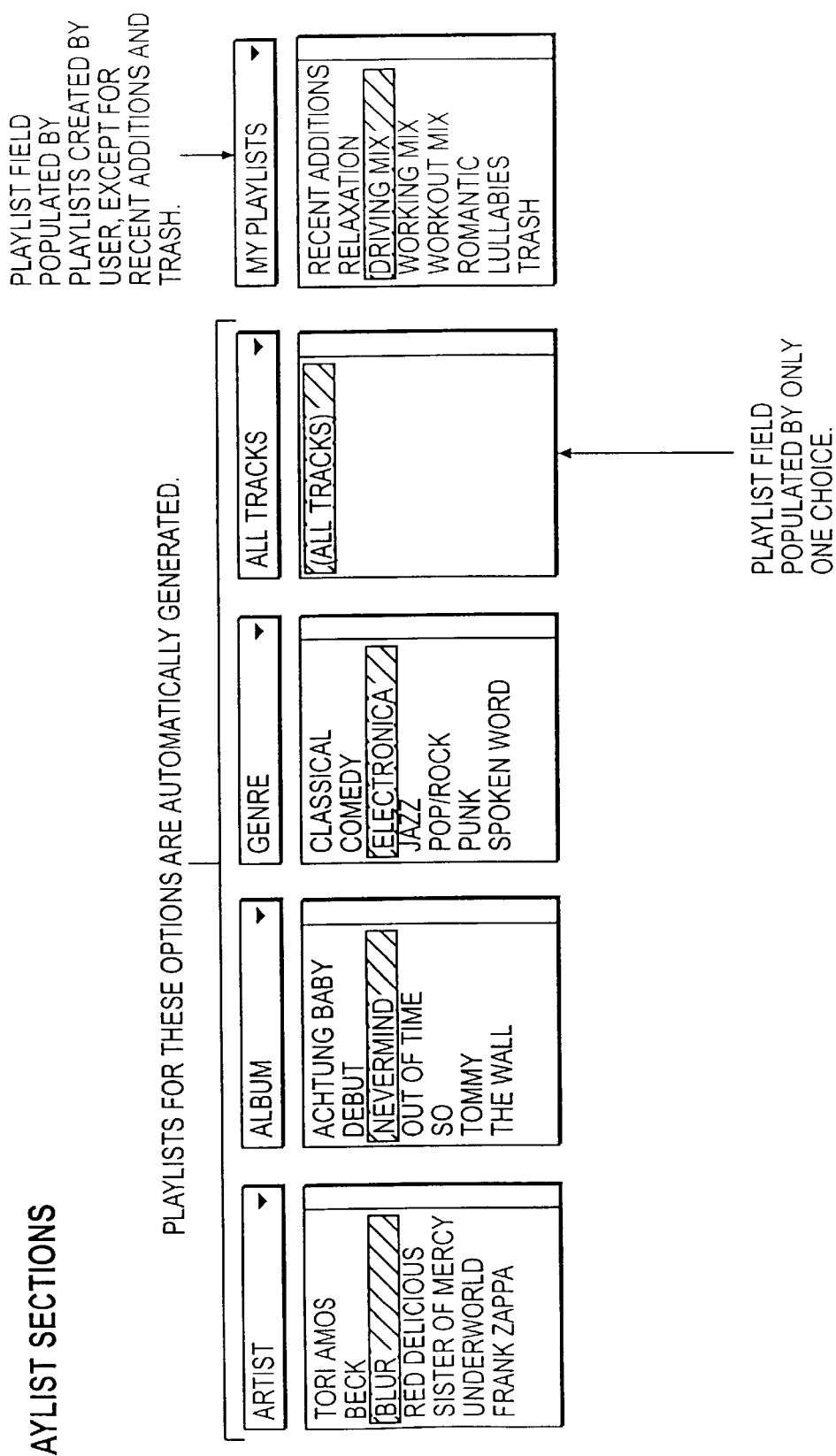
Figure 10:
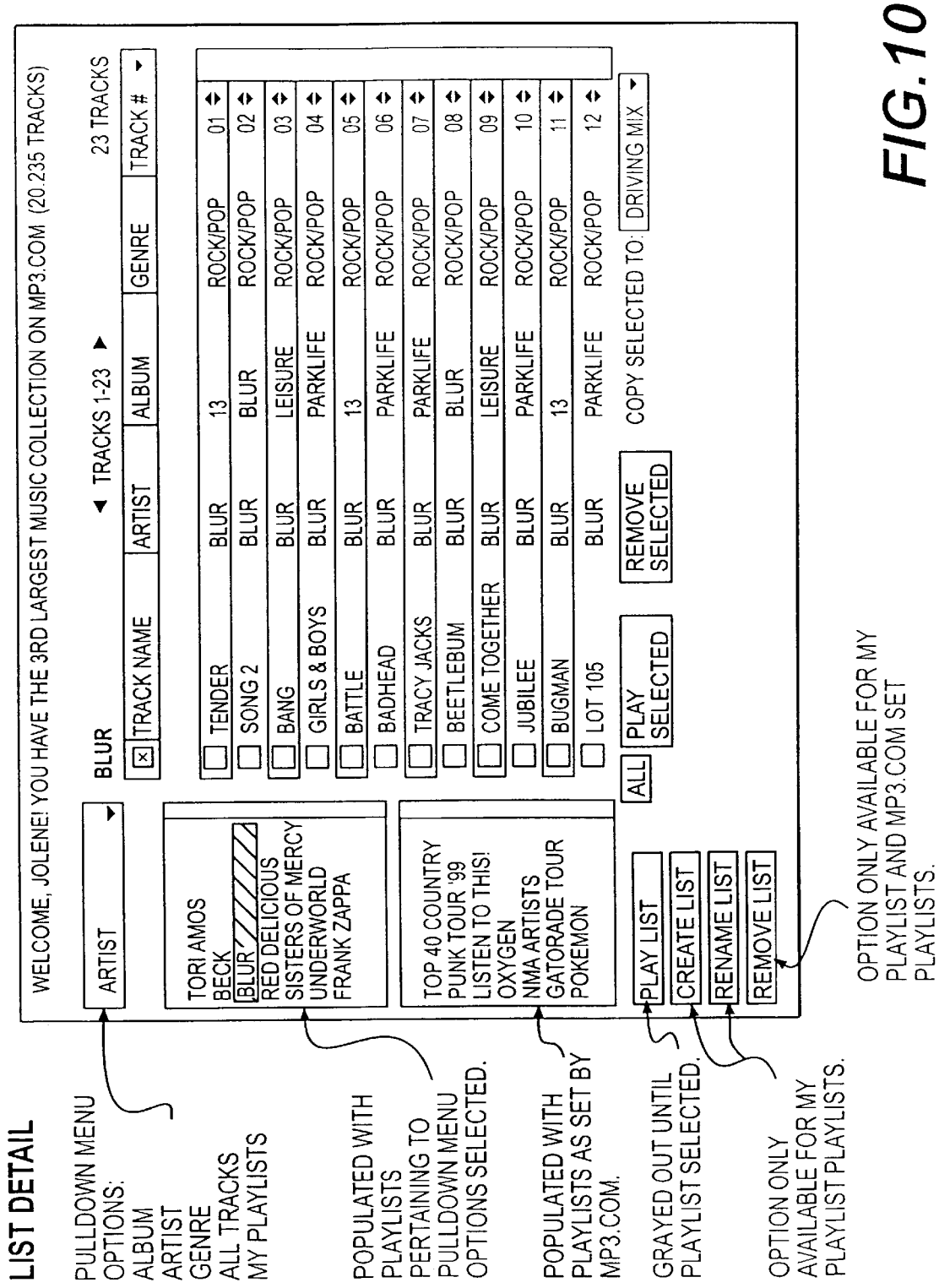
Figure 11:
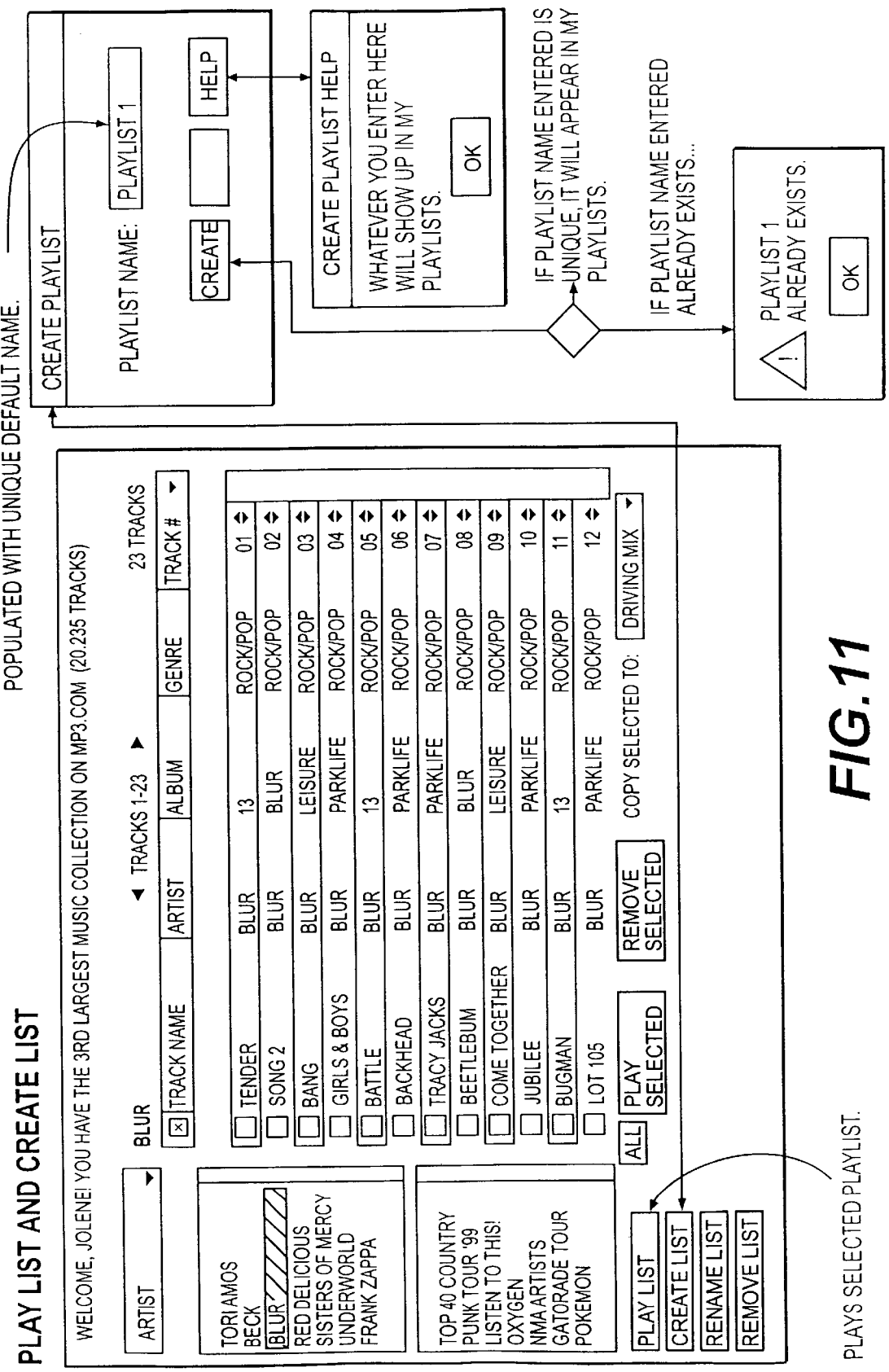
Figure 12:
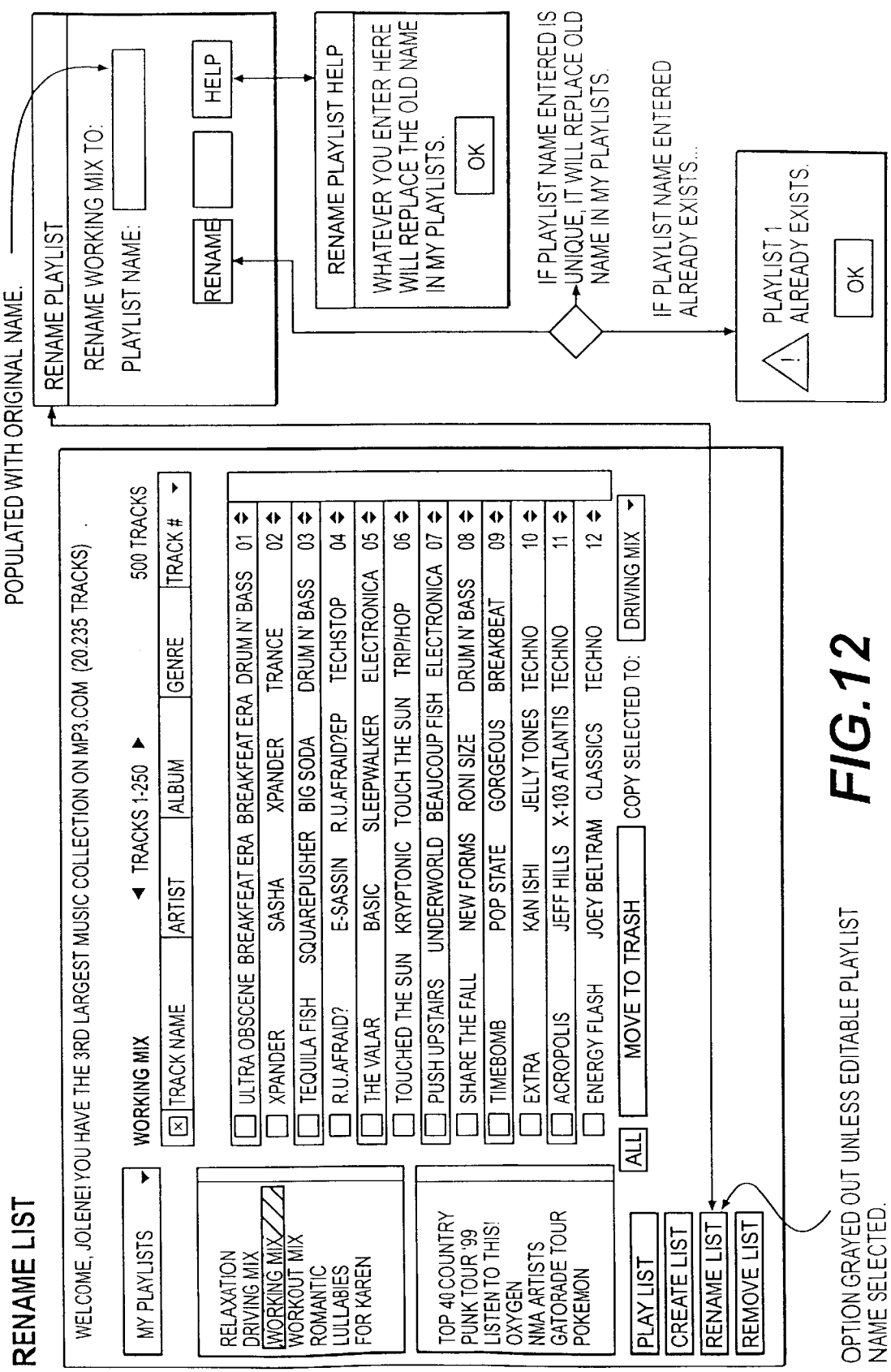
Figure 16:
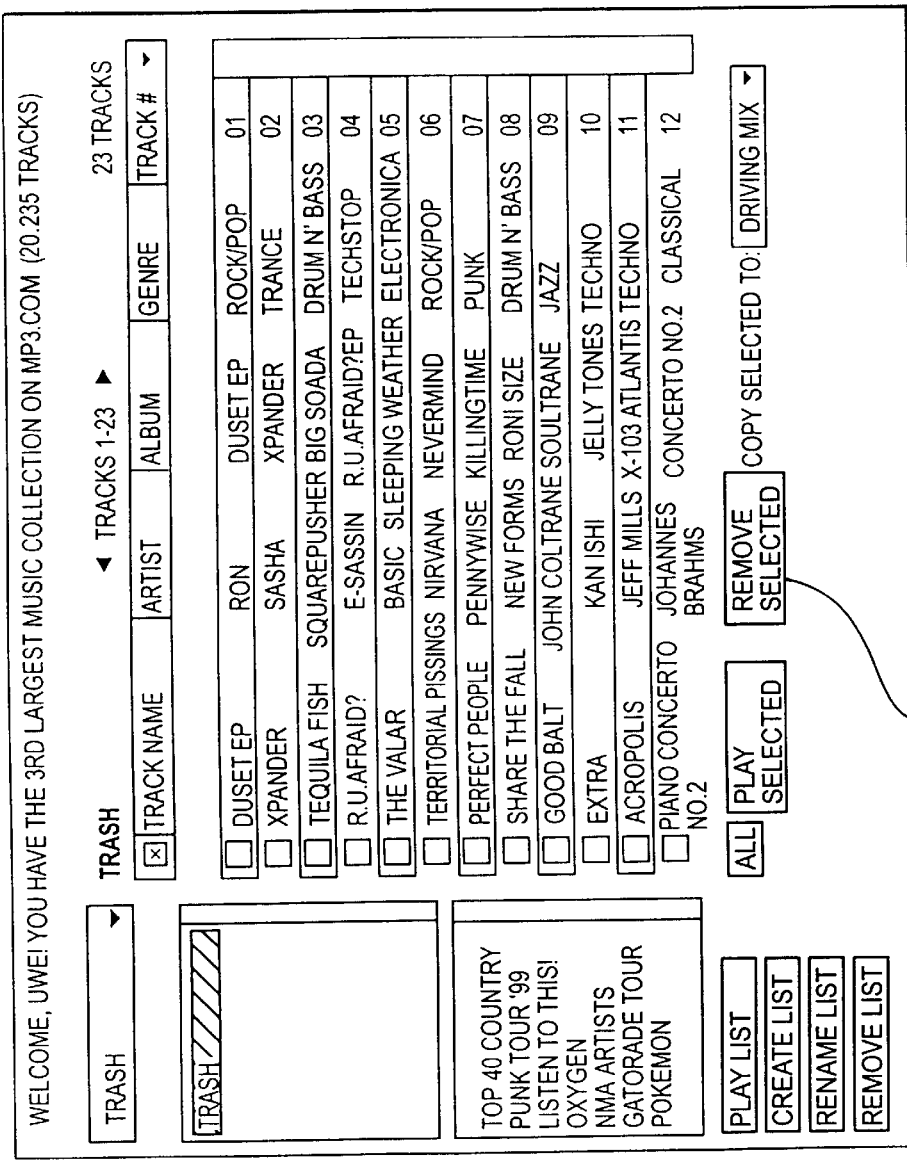
Figure 17:
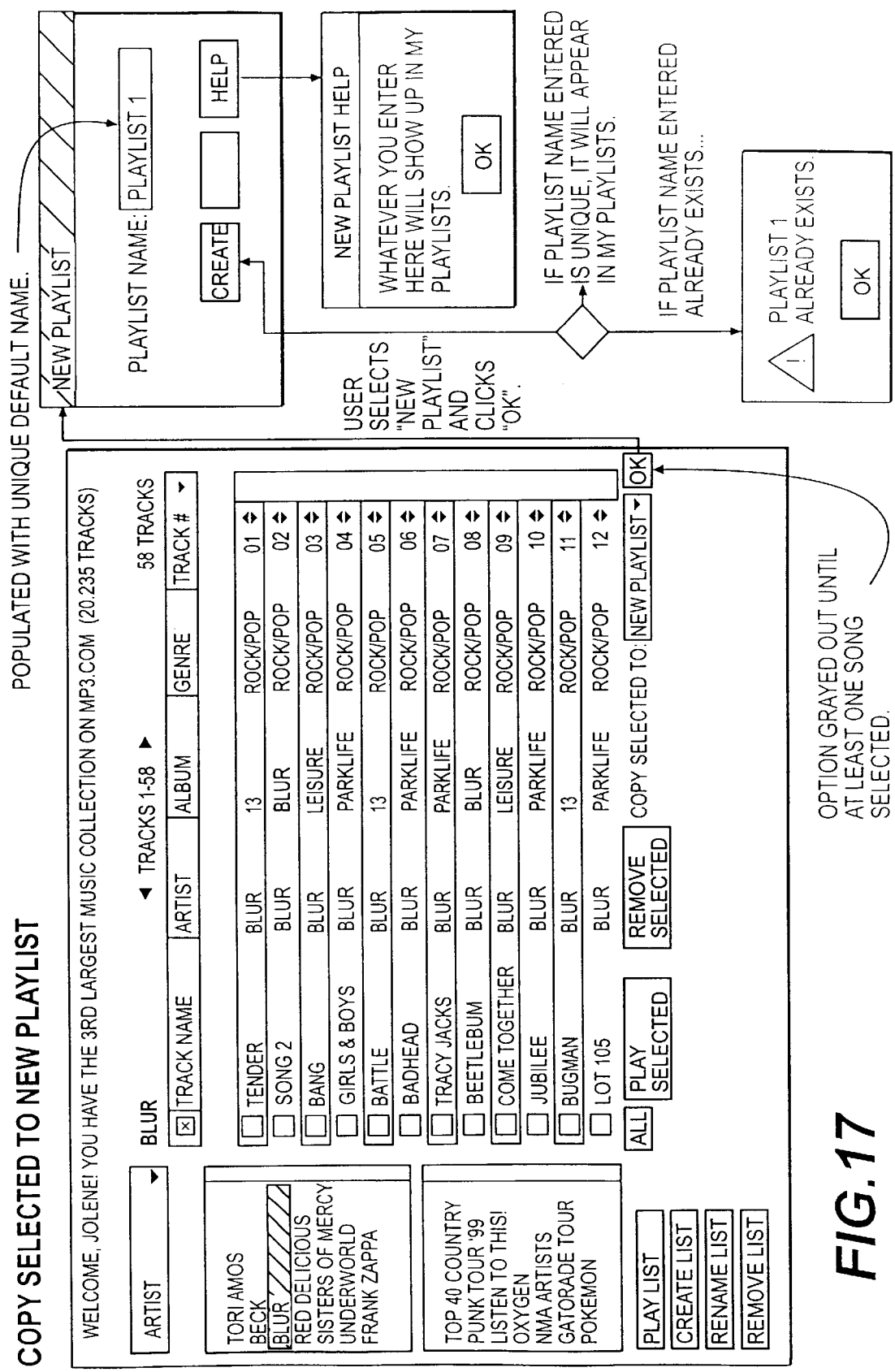

For example, as shown in FIG. 5, the customer sample may need to be shifted forward or backward to perform a more accurate verification. The results of shifting one of the samples across time is shown in FIG. 6. Once the Verification Server 141 identifies the corresponding portions of the samples with maximum correlation, Verification Server 141 can size down the two waveforms until they contain the same portion of the track, as shown in FIGS. 6 and 7.

Once the most closely corresponding portions of the samples or works are identified, the verification process compares these possibly corresponding portions of the samples. In a preferred embodiment, the verification process runs a Fast Fourier Transform ("FFT") algorithm on each WAV samples to generate their respective power spectrums. The computer can then compare these two spectrums.

The Verification Server 141 performs the FFT. The FFT provide a frequency analysis of the data. The Verification Server 141 compares either or both channels of a stereo audio file and averages the results. When the data on the physical work matches the data on the electronic work perfectly, the difference between the audio files in the power spectrum can be 0.000. Conversely, if a CD is badly scratched at this specific location on the disk or the physical work is different from the electronic work, the two data may not compare too well. However, in a preferred embodiment, a scratch should only affect one or two samples of the 20 samples so that the system could still recognize the match. Additionally, as an alternative to FFT, the Verification Server 141 can perform direct waveform comparisons of the sampled and stored data.

If the received information identically or substantially matches only one stored CD, then the Verification Server 141 automatically stores a pointer to the formatted version of this title in the client's personal account. Otherwise, the Verification Server 141 asks for additional data (e.g., send the seven sectors of data found on track four at the tenth second of playing time). The system repeats this process until it has received an acceptable amount of data to verify or reject the CD in the user's machine or until it completes a predetermined set of requests. The number of requests for information by the Verification Server 141 can vary as necessary, as can the number of channels of data and sampling rate.

In an alternative embodiment, the Verification Server 141 can make all of its requests for information and complete its verification process before notifying the user that their request has been verified or rejected. This embodiment protects the integrity of the interrogation process, because the user's machine receives no feedback as to the specific point where the request failed. In another embodiment, the entire verification process can be repeated to further narrow the number of works found within a search or to increase the certainty of the process.

The system can also repeat the verification process for each work that the client desires to have in their personal account.

In another alternative embodiment, the verification step may not include loading a physical work into a client machine at all. Instead, the user may demonstrate that they ordered a physical work. The Distributor Location 100 may recognize that the user ordered a physical work in many ways. For example, in a preferred embodiment, the distributor may know that the user purchased the work from a retailer because the retailer sent the distributor a message authorizing the distributor to provide the user with access to an electronic work. To control the integrity of these messages, the distributor may only accept such messages from certain IP addresses, or may require the retailer to provide a security key or password.

In another embodiment, the Distributor Location 100 may know that the user has ordered a physical work because the order was submitted through the distributor. Thus, the distributor takes the order and records the information related to the order, including user name, email address, credit card number or other billing information, unique identifier of the ordered work, or confirmation number, and forward the order to the retailer. In yet another embodiment, the Distributor Location 100 may obtain verification that the user purchased the work based on a confirmation number entered by the user or retailer.

In another embodiment, the Distributor Location 100 may receive the order information from another location, such as a partner or other third party. In a preferred embodiment, the distributor is partnered with a retailer. For example, the distributor may communicate with a plurality of retailer locations via an application program interface made for retailers. The retailer API may enable retailers to host user accounts, folders, or files. In this example, a user purchases a work from a retailer, the retailer sets up a user account. Then the user can purchase a work from the retailer and shortly thereafter access the work via the network 130. Further, the distributor or retailer can deactivate access to a work if the consumer returns or exchanges the work later.

If the user returns a work, the retailer may deactivate the user's access to an electronic copy or notify the distributor to deactivate the user's access to the electronic copy. The retailer may check to determine whether the user already accessed the electronic copy before it allows the user to return the work. For example, the retailer may not allow the user to return the work if the user already accessed the electronic work. In yet another alternative embodiment, the retailer API can allow retailers to access a user's account or folder at the Distributor Location 100.

In a preferred embodiment, the retailer API may perform one-way authentication to verify the identity of the retailer. For example, the retailer would need to enter a login and/or password, or any other well-known technique that the order or authorization information is actually from a retailer.

Also, such communications between a retailer and distributor are preferably secure (i.e., encoded and/or encrypted) to prevent a non-retailer from obtaining a retailer's retailer identification or password. For example, the retailer API secures the retailer's identification and/or password with encoding or encryption.

In other embodiments, the system may use one of many available encryption methods (public or nonpublic). A basic introduction to some encryption and decryption techniques is described in the text written by Bruce Scheiner entitled *"Applied Cryptography: Protocols, Algorithms And Source Code in C,"* published by John Wiley & Sons, 1994, the entirety of which is hereby incorporated by reference. Moreover, more detailed descriptions of systems and apparatuses for accomplishing encryption and decryption in computer networks are set forth in U.S. Pat. Nos. 5,903,652, 5,850,442, and 5,580,446, the entirety of each of which is incorporated by reference.

When encryption is used, each retailer API may have a unique encryption key that is shared with the Distributor Location 100. The Distributor Location 100 uses this unique encryption key to identify and authenticate the specific retailer API.

In a preferred embodiment, the retailer API may send various types of data packets or API function calls to the Distributor Location 100. These packets can include user email data, a retailer identification, an order number, a UPC, and band, title, checksum data, or any other potentially useful data. For example, a retailer may issue an "activate_cd" (user email, order #, retailer id, UPC, band, title) message to enable the user to listen to the purchased work. When the server tier 28 receives an activate_cd request, the Verification Server 141 checks to see if the transaction already exists in an invoice table. If it exists and is active, it is ignored. If it exists and is inactive, the system activates the record and sets the appropriate media for the user to "purchased." If the record does not exist, the system creates invoice and verification records for the user. The verification table stores the status as "purchased" in the verification table. The server then returns a confirmation of this transaction to the user via email. If the Verification Server 141 cannot find an appropriate match for the requested work identifier, such as UPC, title, or band, then the work does not exist in the Content Repository 142. The Verification Server 141 then communicates this to the user and to a customer representative with the distributor so that distributor may attempt to add this work to their database.

The retailer may also issue a "deactivate_cd" (user email, order #, retailer id, UPC) to disable access to a CD for a particular customer. When the Distributor Location 100 receives a deactivate_cd call, the Verification Server 141 checks to see if the transaction exists in the invoice table. If it does not exist, it is ignored. If it exists and is deactivated, it is ignored. If it exists and is active, then the system deactivates it. The Verification Server 141 will then check to see if the user identification has any other active order for this particular work. If so, then the Verification Server 141 takes no further action, because the user owns another copy of the work under a different order or retailer. If this is the last order with this media identification, the Verification Server 141 sets the media identification in the verified table to "unpurchased."

The retailer may also send a "has_accessed_cd" message when a user attempts to return or exchange a previously purchased work. When the Verification Server 142 receives this message, the Verification Server 142 checks the user's account to see if the user has previously accessed (i.e., downloaded, streamed, opened, read, watched, or listened to) the electronic copy of the work. The Verification Server 142 also checks the invoice table to see if the user owns multiple copies of the same work. If the user only owns one copy of work and has not previously accessed the work, the Verification Server 142 communicates this information to the retailer API. If the user has multiple copies of the work, then the system only knows that the consumer has listened to at least one copy and will communicate this information to the retailer. The consumer thus cannot exchange this CD. If the user has previously used their electronic copy of the work, the retailer may not permit the user to exchange the work.

Once a work is loaded or accessible to a user, the user can access those works through a variety of graphical user interfaces and organization models, such as a juke box, alphabetically, by artist, by type of work, by category of work, by verification date, etc.. In a preferred embodiment, the works are organized as shown in FIGS. 8–19.

The user may be provided with access to the electronic works identified in their account by downloading, streaming, email enclosure, or many other well-known techniques. Such access may be provided via the user's personal computer, cell phone, personal digital assistant, pager, car stereo, television or any media player. Before providing such access, the Content Delivery System 152 may attempt to identify what media player the user is accessing the works with. These characteristics may be automatically provided to the Distributor Location 100 as a header or some other information field included with the user data. The Distributor Location 100 could also request the information automatically from the user's device or the user. If the information is requested from the user, the user could identify their device by manually entering "cell phone" into a blank field or selecting their device from a list of available devices. In an alternative embodiment, it may also be able to identify the user's device to accommodate for geographically specific server farms.

In a preferred embodiment, a user may access the works identified in their account from anywhere connected to the network 130. Since this network is preferably the Internet and may be accessed with cellular transmission, such access is geographically unrestricted. In an alternative embodiment, the network 130 may be a local or regional network with geographical restrictions.

In another preferred embodiment, a user may be provided with a work by the Content Delivery System 152. The Content Delivery System 152 receives a request for access to a particular piece of content or work either directly from the user or from another component with the Distributor Location. As part of the request, the System 152 may receive or generate a secure, tamper proof, encrypted URL to represent that request. Within the Content Delivery System 152, the coder/decoder decodes the URL, forwards some of the information with the request to the translation module, and discards the remaining information. The translation module translates the URL into a unique identifier of the requested content.

The validation module validates that the user is entitled to receive the work. In a preferred embodiment, the validation module performs Valid From Date ("VFD") data management and concurrency checking. The validation module performs concurrency checking by monitoring which users are logged into the Distributor Location 100 at any given time. Such information is useful because user accounts and lockers each have different access privileges. For example, a company may have a user account that entitles every employee of a company to access the account. To obtain such an account, the user may have paid more for a group license to a work or obtain multiple copies of the same work.

In another embodiment, the access privileges for a user account may only permit a single individual to access the account. For example, if a single user buys a copy of a copyrighted CD, only that user may access the account. Thus, if a second user attempts to access the work while a first user is already logged into the account, the system recognizes that both of these users are not entitled to access this work. When a possible breach of the access privileges is detected, the system may automatically deactivate all the works in the account, shutdown the account immediately, deny the concurrent request for access, suspend the account, or prohibit any subsequent access to the account. In addition, the validation module may log information about the concurrent request for access, such as the user identification, the time, where they were logging in from, etc. and notify the user of the integrity breach so that they can explain themselves if it was a mistake.

With regard to VFD data management, the Content Delivery System 152 validates the time stamp embedded within the URL. The time stamp indicates the time at which the work was selected. Such a time stamp may be used for validation by testing whether the time stamp expired, testing whether the time stamp was before the VFD of the user's account, or a variety of other ways. For example, a URL may be acquired at 9:00 am and expire twenty four hours later so that any attempt to access that URL after 9:00 am the next day is not validated.

In another example, the URL representative of the request for access to a work is compared with the VFD of the user's account. If the time stamp on the URL of the request is before the VFD of the user's account, the request is not validated. Such a test may be used to preclude users from sharing account information or other unauthorized uses. For example, the Content Delivery System 152 may recognize that a user shared their account information due to concurrency checking. Accordingly, the Content Delivery System 152 may reset the VFD on the user's account so that any URLs acquired prior to that time are no longer valid. Further, if both the account holder and the unauthorized user were identified to have account, the System 152 could reset the VFD on both accounts. In another alternative embodiment, the VFD may be automatically adjusted for accounts using limited time offers, such as a distributor providing user's with free access for thirty days or an artist providing free access to their work for a week.

In another embodiment, the validation module validates the user based on a counter. For example, when a work is provided to a user, the user's counter is incremented. When the act of providing the work to the user completes, the user's counter is decremented. If a URL is requested and the user's counter exceeds one, the user's request is not validated and the "valid from date" is set to the current date and time. In yet another embodiment, the media player software, known as the User Agent, used to receive an electronic work via download or stream is recorded in the user's account information. If subsequent works are requested by a different User Agent, the request is not validated and the VFD is set to the current date and time. Similarly, the Autonomous System Number ("ASN") (i.e., essentially a map between the IP address and the Internet Service Provider) associated with a user's requests is recorded. If a subsequent address is made from a different ASN, the request is not allowed and the VFD is set to the current date and time.

In yet another embodiment, the validation module validates by comparing the current session identifier provided within a requested URL to a stored session identifier. When a user logs into their account, they receive a session identifier unique to that machine, which is stored in their account record. If the user requests an electronic work, the validation module compares the session identifier stored within the user's account to that contained within the URL for the work. If the session values are different, the request is not validated.

Once the Content Delivery System 152 validates a user, the System 152 uses the unique content identifier within the URL to determine where the requested work is stored, such as local memory, the Content Repository 142, or some other memory. In a preferred embodiment, the Content Delivery System 152 searches for the requested work in the local storage of the particular server accessed in the System 152. If the work is not present in the local storage of that server, the System 152 searches the local memory of the other servers or databases within the System 152. If the work is not present in the local memory of any of the System's servers, the System 152 accesses a bridge to the Content Repository 142 to determine whether the work is stored there. If the work is within any of these memories, it is provided to the user. If the work is not present in any of these memories, the system may continue to try other servers or databases, including remote servers and databases, or it may notify the user that the requested work is unavailable.

For example, a user accesses the web site provided by the distributor. While on the site, the user selects a work. Based on the selection, the User Interface Server 120 generates a URL. Next, the URL is provided to the Content Delivery System 152 and the user. The Content Delivery System 152 extracts a unique content identifier from the secure URL, and attempts to locate the work with the Content Delivery System 152 or the Content Repository 142. If the work is present, the Content Delivery System 152 provides the user with access to the electronic work by downloading, streaming, broadcasting or other well-known delivery techniques.

CONCLUSION

While various embodiments of the present invention have been described above, it should be understood that they have been presented by way of example only, and not limitation. For example, the present invention is not limited to the physical arrangements or use with any particular network. As such, the breadth and scope of the present invention should not be limited to any of the above-described exemplary embodiments, but should be defined only in accordance with the following claims and their equivalents.

We claim:

1. A method of providing electronic works, comprising the steps of:
   offering electronic works to a user over a network,
   receiving a request for access to at least one electronic work over the network;
   verifying the user is authorized to access the requested electronic work;
   providing the user with access to the requested electronic work over the network; and
   storing electronic works;
   wherein the step of verifying includes the steps of:
      receiving data corresponding to at least one track offset of a physical work, and
      comparing the at least one track offset of the physical work to a corresponding track offset on at least one stored electronic work.

2. The method of claim 1, wherein the physical work is a compact disk.

3. The method of claim 1, wherein the step of verifying includes the step of:
   acquiring identification information from the physical work, and
   identifying at least one electronic work for the comparison.

4. The method of claim 3, wherein the identification information is a title of the physical work.

5. The method of claim 1, wherein the step of comparing compares a range of values for a track offset of the physical work to the stored electronic works.

6. The method of claim 1, wherein the step of comparing compares a plurality of track offsets.

7. A method of providing electronic works, comprising the steps of:
   offering electronic works to a user over a network,
   receiving a request for access to at least one electronic work over the network;
   verifying the user is authorized to access the requested electronic work;
   providing the user with access to the requested electronic work over the network; and
   storing electronic works;
   wherein the step of verifying includes the steps of:
      sending a request to obtain data corresponding to at least a portion of a physical work;
      receiving data corresponding to the at least a portion of the physical work; and
      comparing the at least a portion of the physical work with a corresponding portion of at least one electronic work to determine whether to grant the request.

8. The method of claim 7, wherein the step of comparing includes correlation to identify the corresponding portions of the at least a portion of the physical work and the corresponding portion of the at least one electronic work.

9. The method of claim 7, wherein the step of comparing includes phase shifting either the at least a portion of the physical work or the corresponding portion of the at least one electronic work.

10. The method of claim 8 or 9, comprising the step of:
    increasing size of the portion of the physical work or the corresponding portion of the at least one electronic work prior to comparison.

11. The method of claim 7, wherein the step of comparing includes a Fast Fourier Transform analysis on the portion of the physical work and the corresponding portion of the at least one electronic work.

12. The method of claim 7, wherein the step of comparing includes comparing time domain samples from the portion of the physical work.

13. The method of claim 7, where the step of comparing accommodates a margin of error allowance.

14. The method of claim 7, further comprising the step of:
    repeating the verifying step.

15. The method of claim 1, wherein the step of verifying further includes the steps of:
    sending a request to obtain data corresponding to at least a portion of a physical work;
    receiving data corresponding to the at least a portion of the physical work; and
    comparing the at least a portion of the physical work with a corresponding portion of at least one electronic work to determine whether to grant the request.

16. A method of acquiring an electronic version of a work, comprising the steps of:
    obtaining a physical work;
    creating an electronic work from the physical work;
    extracting samples of data from the physical work;
    identifying an electronic work in an encoding queue;
    retrieving the electronic work identified in the encoding queue; and
    transferring the retrieved electronic work to storage.

17. The method of claim 16, further comprising the step of providing encoders in a queue based, database mediated configuration.

18. The method of claim 16, wherein the step of extracting further extracts index information.

19. The method of claim 18, wherein the index information identifies what samples of the physical work were extracted.

20. The method of claim 16, further comprising the step of:
    labeling the physical work.

21. The method of claim 20, wherein the physical work is labeled with a UPC code.

22. The method of claim 16, further comprising the step of:

labeling the electronic work with a label corresponding to the label on the physical work.

23. The method of claim 16, further comprising the steps of:

labeling the electronic work; and using the label of the electronic work as a unique identifier for accounting purposes.

24. The method of claim 16, further comprising the step of:

loading pointers to the electronic work into the encoding queue.

25. The method of claim 16, wherein the encoding queue uses a first in, first out scheduling algorithm.

26. The method of claim 16, further comprising the step of:

encoding the electronic work identified in the encoding queue.

27. The method of claim 26, wherein the step of encoding encodes two versions of the electronic work.

28. The method of claim 27, wherein the two versions of the electronic work are a 24 kilobit per second version and a 128 kilobit per second version.

29. The method of claim 24, further comprising the step of:

inserting pointers into the encoding queue to indicate which encoded electronic works are ready for the transferring step.

30. The method of claim 18, wherein the transferring step also transfers the index information.

31. A method of delivering electronic works, comprising the steps of:

receiving a request for access to an electronic work and a form of user identification from a device;

identifying characteristics of the requesting device;

verifying the form of user identification against stored information;

storing frequently requested items locally in memory; and providing the device with access to the electronic work;

wherein the verifying step includes checking whether the user is simultaneously logged in from another device.

32. A method of acquiring an electronic work, comprising the steps of:

logging into a service offering access to at least one electronic work;

sending a request to access at least one electronic work and a form of identification;

demonstrating authorization to receive the requested electronic work; and obtaining access to the requested electronic work;

wherein the step of demonstrating includes sending a confirmation number for the purchase of a physical work.

33. An apparatus for providing electronic works, comprising:

means for offering electronic works to a user over a network;

means for storing at least one of the offered electronic works;

means for receiving a request for access to at least one electronic work over the network;

means for verifying the user is authorized to access the requested electronic work wherein the means for verifying includes:

means for receiving data corresponding to at least one track offset of a physical work, and means for comparing the at least one track offset of the physical work to a corresponding track offset on at least one stored electronic work; and means for providing the user with access to the requested electronic work over the network.

34. The apparatus of claim 33, wherein the means for verifying further includes:

means for sending a request to obtain data corresponding to at least a portion of a physical work;

means for receiving data corresponding to the at least a portion of the physical work; and means for comparing the at least a portion of the physical work with a corresponding portion of at least one electronic work to determine whether to grant the request.

35. An apparatus for providing electronic works, comprising:

means for offering electronic works to a user over a network;

means for storing at least one of the offered electronic works;

means for receiving a request for access to at least one electronic work over the network;

means for verifying the user is authorized to access the requested electronic work wherein the means for verifying includes:

means for sending a request to obtain data corresponding to at least a portion of a physical work, means for receiving data corresponding to the at least a portion of the physical work, and means for comparing the at least a portion of the physical work with a corresponding portion of at least one electronic work to determine whether to grant the request; and means for providing the user with access to the requested electronic work over the network.

36. An apparatus for acquiring an electronic version of a work, comprising:

means for obtaining a physical work;

means for creating an electronic work from the physical work;

means for extracting samples of data from the physical work;

means for identifying an electronic work in an encoding queue;

means for retrieving the electronic work identified in the encoding queue; and means means for transferring the retrieved electronic work to storage.

37. An apparatus for providing electronic works, comprising:

a server for offering electronic works to a user over a network, wherein the server stores at least one of the offered electronic works, wherein the server receives a request for access to at least one electronic work over the network;

wherein the server verifies the user is authorized to access the requested electronic work by receiving data corresponding to at least one track offset of a physical work, and comparing the at least one track offset of the physical work to a corresponding track offset on at least one stored electronic work; and wherein the server provides the user with access to the requested electronic work over the network.

38. The apparatus of claim 37, wherein the server also sends a request to obtain data corresponding to at least a portion of a physical work, receives data corresponding to the at least a portion of the physical work, and compares the at least a portion of the physical work with a corresponding portion of at least one electronic work to determine whether to grant the request.

39. An apparatus for providing electronic works, comprising:

a server for offering electronic works to a user over a network, storing the offered electronic works, and receiving a request for access to at least one electronic work over the network;

wherein the server also verifies the user is authorized to access the requested electronic work by sending a request to obtain data corresponding to at least a portion of a physical work, receiving data corresponding to the at least a portion of the physical work, and comparing the at least a portion of the physical work with a corresponding portion of at least one electronic work to determine whether to grant the request; and wherein the server also provides the user with access to the requested electronic work over the network.

* * * * *